US012719797B2

(12) United States Patent
Ma et al.

(10) Patent No.: US 12,719,797 B2
(45) Date of Patent: Aug. 25, 2026

(54) MEASURING DATA PACKET DELAY IN AN END-TO-END COMMUNICATION PATH

(71) Applicant: QUALCOMM Incorporated, San Diego, CA (US)

(72) Inventors: Liangping Ma, San Diego, CA (US); Prashanth Haridas Hande, San Diego, CA (US); Martin Renschler, San Diego, CA (US); Sebastian Speicher, Wallisellen (CH); Imed Bouazizi, Frisco, TX (US); Thomas Stockhammer, Bergen (DE); Nikolai Konrad Leung, San Francisco, CA (US); Peerapol Tinnakornsrisuphap, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 446 days.

(21) Appl. No.: 18/168,903

(22) Filed: Feb. 14, 2023

(65) Prior Publication Data

US 2024/0187347 A1 Jun. 6, 2024

Related U.S. Application Data

(60) Provisional application No. 63/386,286, filed on Dec. 6, 2022.

(51) Int. Cl.
*H04L 47/10* (2022.01)
*H04L 47/2491* (2022.01)
(Continued)

(52) U.S. Cl.
CPC .......... *H04L 47/18* (2013.01); *H04L 47/2491* (2013.01); *H04W 24/08* (2013.01); *H04W 28/0268* (2013.01)

(58) Field of Classification Search
None
See application file for complete search history.

(56) References Cited

U.S. PATENT DOCUMENTS 8,873,590 B2 * 10/2014 Kim .................. H04N 21/6437 370/252
2010/0020829 A1 * 1/2010 Ruffini .................. H04J 3/0632 370/509

(Continued)

FOREIGN PATENT DOCUMENTS

CN 114189908 A * 3/2022 ............ H04W 28/24
KR 20100062876 A 6/2010

OTHER PUBLICATIONS

Machine English translation of CN 114189908 (Year: 2025).*
International Search Report and Written Opinion—PCT/US2023/037054—ISA/EPO—Mar. 12, 2024 15 pages.

*Primary Examiner* — Peter P Chau
(74) *Attorney, Agent, or Firm* — Dinsmore & Shohl LLP

(57) ABSTRACT

Embodiments of systems and methods for measuring data packet delays in an end-to-end communication path according to some embodiments may include transmitting from a first computing device to a second computing device first delay measurement information in a first packet with a header portion configured to indicate that the first packet is a data packet, receiving from the second computing device second delay measurement information in a second packet with a header portion configured to indicate that the second packet is a data packet, determining a data packet delay between the first computing device and the second computing device based on transmit timing information of the first packet and receive timing information of the second packet, and using the determined packet delay to set a quality of service for a communication path between the first computing device and the second computing device.

23 Claims, 34 Drawing Sheets

(51) Int. Cl.
*H04W 24/08* (2009.01)
*H04W 28/02* (2009.01)

(56) References Cited

U.S. PATENT DOCUMENTS

| | | | | |
|---|---|---|---|---|
| 2014/0293825 | A1* | 10/2014 | Kalkunte | H04L 43/0852 370/474 |
| 2016/0174085 | A1 | 6/2016 | Sung et al. | |
| 2021/0250268 | A1 | 8/2021 | Natarajan et al. | |
| 2021/0274367 | A1* | 9/2021 | Cui | H04L 43/16 |
| 2022/0385543 | A1 | 12/2022 | Villasante Marcos et al. | |
| 2023/0422079 | A1* | 12/2023 | Zhang | H04W 28/24 |
| 2024/0147286 | A1* | 5/2024 | Chen | H04W 24/08 |

* cited by examiner

200

266 Wireless Transceiver

206 Clock

208 Voltage Regulator

202 SOC #1

212 Modem Processor

214 Graphics Processor

216 Applications Processor

218 Coprocessor

230 Temperature sensor(s)

232 Thermal Management Unit

226 Interconnection/Bus

210 Digital Signal Processor

220 Memory

222 Custom Circuitry

224 System Components and Resources

234 Thermal Power Envelope (TPE) Component

250

204 SOC #2

252 5G Modem Processor

254 Power Management Unit

264 Interconnection/Bus 256 mmWave transceiver mmWave transceiver

258 Memory

260 Additional Processor(s)

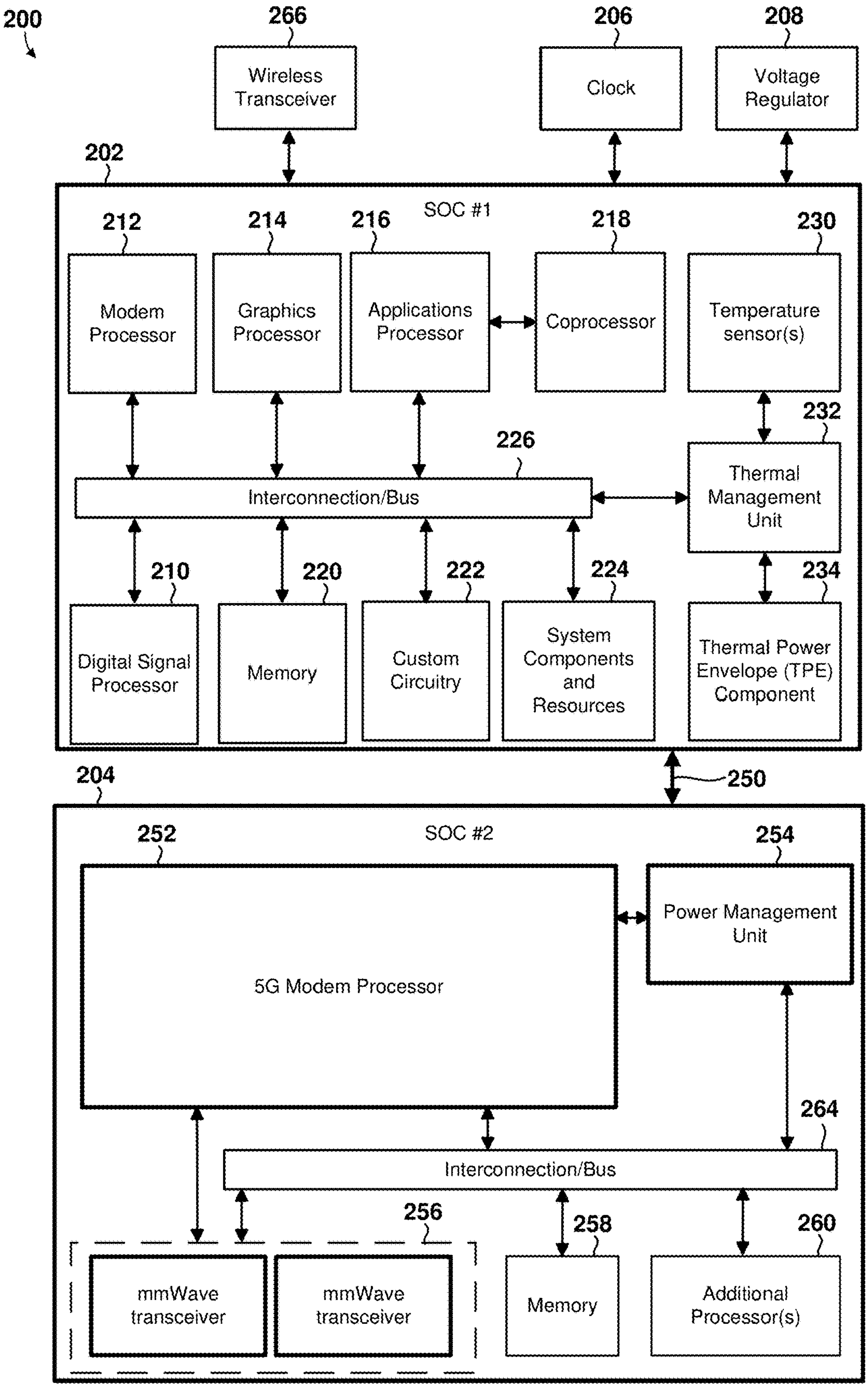

FIG. 2

$$p_n = \frac{N1 - N2 + (N3 - N4)}{N1 - (N2 - N3)}$$

$$p_n = \frac{N2 - N3}{N2}$$

700h

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number 750a    |
+-+-+-+-+-+-+-+-+-+-+-+-+-+-+-+-+-+-+-+-+-+-+-+-+-+-+-+-+-+-+-+-+
|                           timestamp  750b                     |
+-+-+-+-+-+-+-+-+-+-+-+-+-+-+-+-+-+-+-+-+-+-+-+-+-+-+-+-+-+-+-+-+
|           synchronization source (SSRC) identifier 750c       |
+=+=+=+=+=+=+=+=+=+=+=+=+=+=+=+=+=+=+=+=+=+=+=+=+=+=+=+=+=+=+=+=+
|            contributing source (CSRC) identifiers 750d        |
|                             ....                              |
+-+-+-+-+-+-+-+-+-+-+-+-+-+-+-+-+-+-+-+-+-+-+-+-+-+-+-+-+-+-+-+-+

 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      defined by profile       |           length 750e         |
+-+-+-+-+-+-+-+-+-+-+-+-+-+-+-+-+-+-+-+-+-+-+-+-+-+-+-+-+-+-+-+-+
| header extension (how to separate meas. Timestamps & data) 750f
+-+-+-+-+-+-+-+-+-+-+-+-+-+-+-+-+-+-+-+-+-+-+-+-+-+-+-+-+-+-+-+-+
```

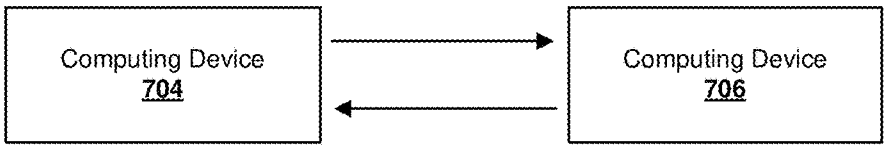

FIG. 7H

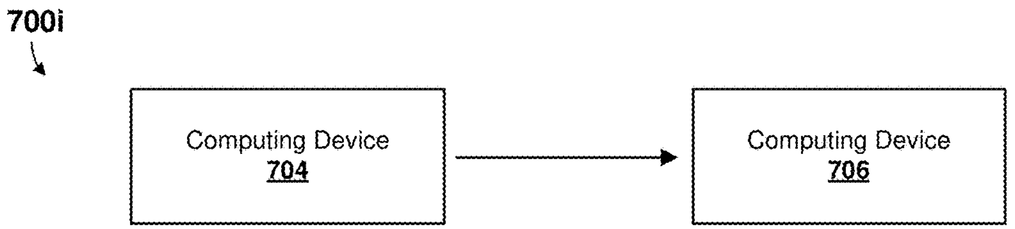

```
0                   1                   2                   3
+=+=+=+=+=+=+=+=+=+=+=+=+=+=+=+=+=+=+=+=+=+=+=+=+=+=+=+=+=+=+=+=+
|         752  NTP timestamp T1, most significant word          |
+-+-+-+-+-+-+-+-+-+-+-+-+-+-+-+-+-+-+-+-+-+-+-+-+-+-+-+-+-+-+-+-+
|              NTP timestamp T1, least significant word         |
+-+-+-+-+-+-+-+-+-+-+-+-+-+-+-+-+-+-+-+-+-+-+-+-+-+-+-+-+-+-+-+-+
```

FIG. 7I

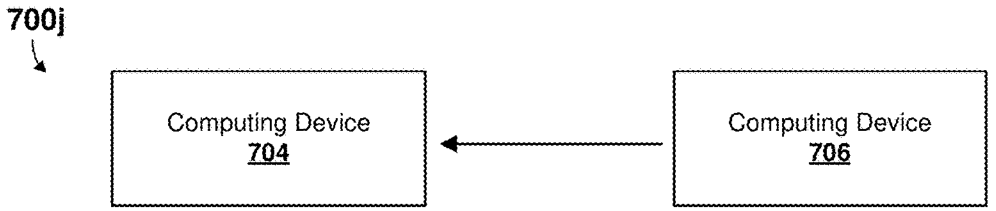

```
+=+=+=+=+=+=+=+=+=+=+=+=+=+=+=+=+=+=+=+=+=+=+=+=+=+=+=+=+=+=+=+=+
|              timestamp T1', 32 middle bits of T1 754a          |
+-+-+-+-+-+-+-+-+-+-+-+-+-+-+-+-+-+-+-+-+-+-+-+-+-+-+-+-+-+-+-+-+
|              delay, 32 middle bits of T2-T1      754b          |
+-+-+-+-+-+-+-+-+-+-+-+-+-+-+-+-+-+-+-+-+-+-+-+-+-+-+-+-+-+-+-+-+
|              delay, 32 middle bits of T3-T2      754c          |
+-+-+-+-+-+-+-+-+-+-+-+-+-+-+-+-+-+-+-+-+-+-+-+-+-+-+-+-+-+-+-+-+
```

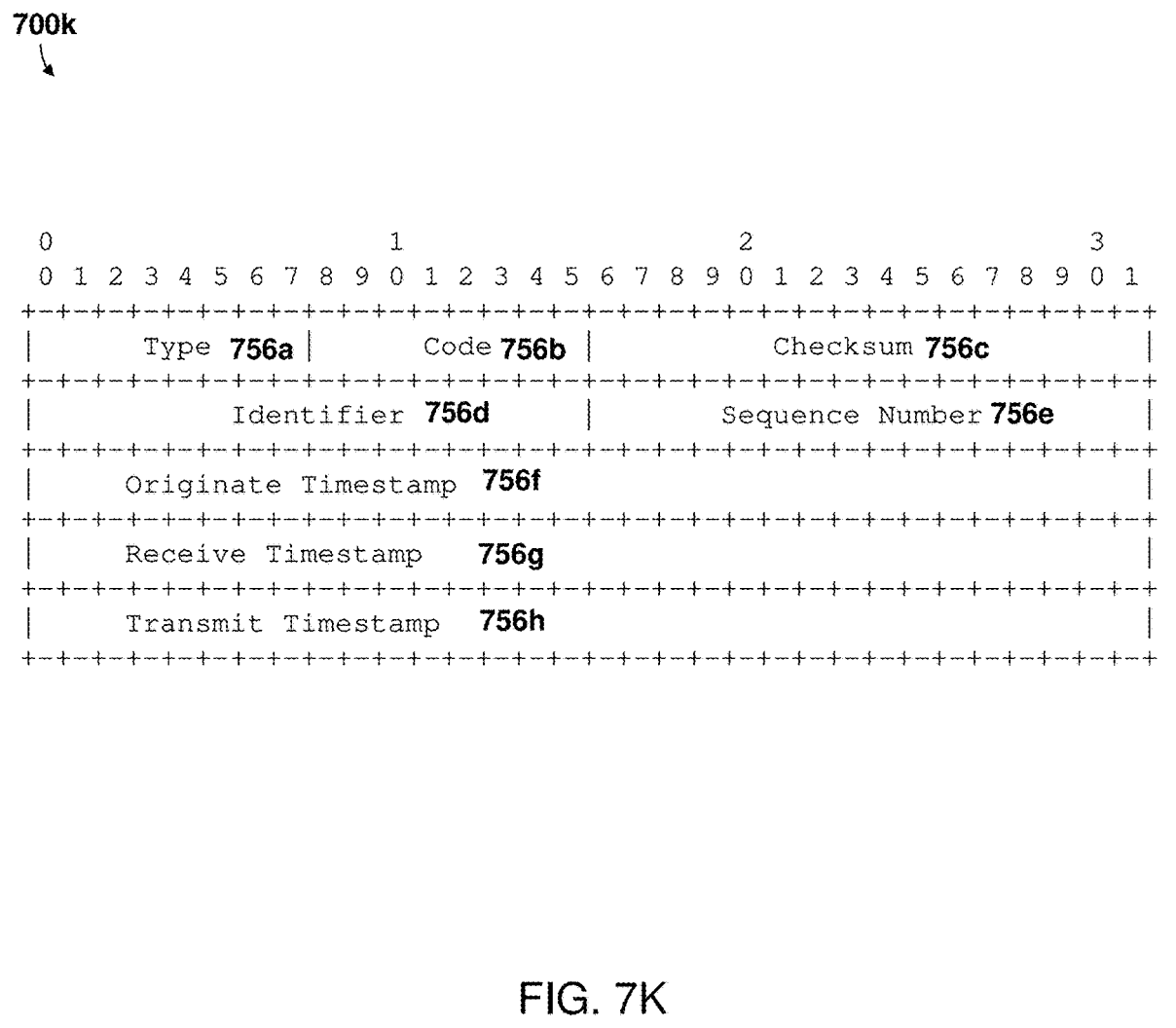

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type 756a  |     Code 756b  |        Checksum 756c          |
+-+-+-+-+-+-+-+-+-+-+-+-+-+-+-+-+-+-+-+-+-+-+-+-+-+-+-+-+-+-+-+-+
|          Identifier 756d        |     Sequence Number 756e      |
+-+-+-+-+-+-+-+-+-+-+-+-+-+-+-+-+-+-+-+-+-+-+-+-+-+-+-+-+-+-+-+-+
|     Originate Timestamp 756f                                    |
+-+-+-+-+-+-+-+-+-+-+-+-+-+-+-+-+-+-+-+-+-+-+-+-+-+-+-+-+-+-+-+-+
|     Receive Timestamp   756g                                    |
+-+-+-+-+-+-+-+-+-+-+-+-+-+-+-+-+-+-+-+-+-+-+-+-+-+-+-+-+-+-+-+-+
|     Transmit Timestamp  756h                                    |
+-+-+-+-+-+-+-+-+-+-+-+-+-+-+-+-+-+-+-+-+-+-+-+-+-+-+-+-+-+-+-+-+
```

FIG. 7K

MEASURING DATA PACKET DELAY IN AN END-TO-END COMMUNICATION PATH

RELATED APPLICATIONS

This application claims the benefit of priority to U.S. Provisional Patent Application No. 63/386,286 entitled "Measuring Data Packet Delay in an End-To-End Communication Path" filed Dec. 6, 2022, the entire contents of which are hereby incorporated herein for all purposes.

BACKGROUND

A communication network may be configured to provide a Quality of Service (QoS) for an application, service, or data flow. There is a resource cost in provisioning a network to provide a certain QoS, so to meet a particular QoS requirement network operators typically attempt to provide sufficient network resources without overcommitting or undercommitting network resources. Providing a QoS for an application, service, or data flow that involves communication across two or more networks of different types is even more complex.

SUMMARY

Various aspects include systems and methods performed by an endpoint computing device for managing data delay in an end-to-end communication path spanning one or more communication networks. Various aspects may include a first computing device configured to transmit to a second computing device first delay measurement information in a first packet with a header portion configured to indicate that the packet is a data packet, receive from the second computing device second delay measurement information in a second packet with a header portion configured to indicate that the second packet is a data packet, determine a data packet delay between the first computing device and the second computing device based on transmit timing information of the first packet and receive timing information of the second packet, and use the determined packet delay to set a quality of service for a communication path between the first computing device and the second computing device.

In some aspects, the header portion of the first packet indicates that a payload portion of the first packet may include the first delay measurement information. In some aspects, a synchronization source (SSRC) field of the header portion of the first packet may be configured to indicate that a payload portion of the first packet includes the first delay measurement information. In some aspects the header portion of the second packet may indicate that a payload portion of the second packet may include the second delay measurement message. In some aspects, an SSRC field of the header portion of the second packet may be configured to indicate that a payload portion of the second packet includes the second delay measurement information. Some aspects may include configuring the first packet and the second packet such that the first delay measurement information or the second delay measurement information includes one or more of an Echo message, an Echo Reply message, a time stamp message, a timestamp, or a collection of timestamps. In some aspects, the delay measurement information may be included in a Real Time Protocol (RTP) packet header extension or in a payload portion of an RTP or Secure RTP (SRTP) packet.

In some aspects, the transmit timing information of the first delay measurement information may include a first transmit time, and the timing information of the second delay measurement information may include the first transmit time, a first receive time by the second computing device, a second transmit time of a second delay measurement by the second computing device, and a second receive time of the second delay measurement by the first computing device. Such aspects may include determining the data packet delay based on the first transmit time and the first receive time, the second transmit time and the second receive time, or the first transmit time, the first receive time, the second transmit time, and the second receive time. Some aspects may include configuring the first packet such that a payload portion of the first packet may include the first delay measurement information and a data portion. Some aspects may include configuring the first packet with a header extension configured to indicate to the second computing device how to extract the first delay measurement information from the first packet.

Some aspects may include using the determined packet delay as part of setting a quality of service for a communication link between the first and second computing device to determine whether a difference between the data packet delay and a previously-determined data packet delay between the first computing device and the second computing device exceeds a delay threshold, and transmitting the determined data packet delay to a network element of a communication network in response to determining that the difference between the data packet delay and the previously-determined data packet delay exceeds a delay threshold. In some aspects, using the determined packet delay, as part of setting a quality of service for a communication link between the first computing device and the second computing device may include determining whether the data packet delay is greater than a previously-determined data packet delay between the first computing device and the second computing device, and transmitting the determined data packet delay to a network element of a communication network in response to determining that the data packet delay is greater than the previously-determined data packet delay.

In some aspects, transmitting the determined data packet delay to a network element of a communication network may include transmitting an indication of the determined data packet delay configured to enable the network element of the communication network to configure the communication network to provide sufficient Quality of Service (QoS) to support an end-to-end QoS requirement based on the determined data packet delay. In some aspects, the communication path between the first computing device and the second computing device may span a first communication network that is a 5G network and a second communication network that is not a 5G network.

Some aspects may include transmitting to the second computing device a configuration offer comprising first configuration information for the transmitting and receiving of delay measurement information, receiving from the second computing device a configuration answer including second configuration information that is a subset of the first configuration information, and using the second configuration to transmit the first delay measurement information and to receive the second delay measurement information.

Further aspects include a computing device having a processor configured to perform one or more operations of any of the methods summarized above. Further aspects include a computing device configured with processor-executable instructions to perform operations of any of the methods summarized above. Further aspects include a non-transitory processor-readable storage medium having stored thereon processor-executable instructions configured to cause a processor of a computing device to perform operations of any of the methods summarized above. Further aspects include a computing device having means for performing functions of any of the methods summarized above. Further aspects include a system on chip for use in a computing device and that includes a processor configured to perform one or more operations of any of the methods summarized above.

BRIEF DESCRIPTION OF THE DRAWINGS

FIG. 2 is a component block diagram illustrating an example computing and wireless modem system suitable for implementing any of the various embodiments.

FIGS. 7H, 7I, 7J, and 7K are diagrams illustrating information structures that may be used by computing devices to transmit or receive in-band delay measurement information according to various embodiments.

DETAILED DESCRIPTION

Figure 1A:
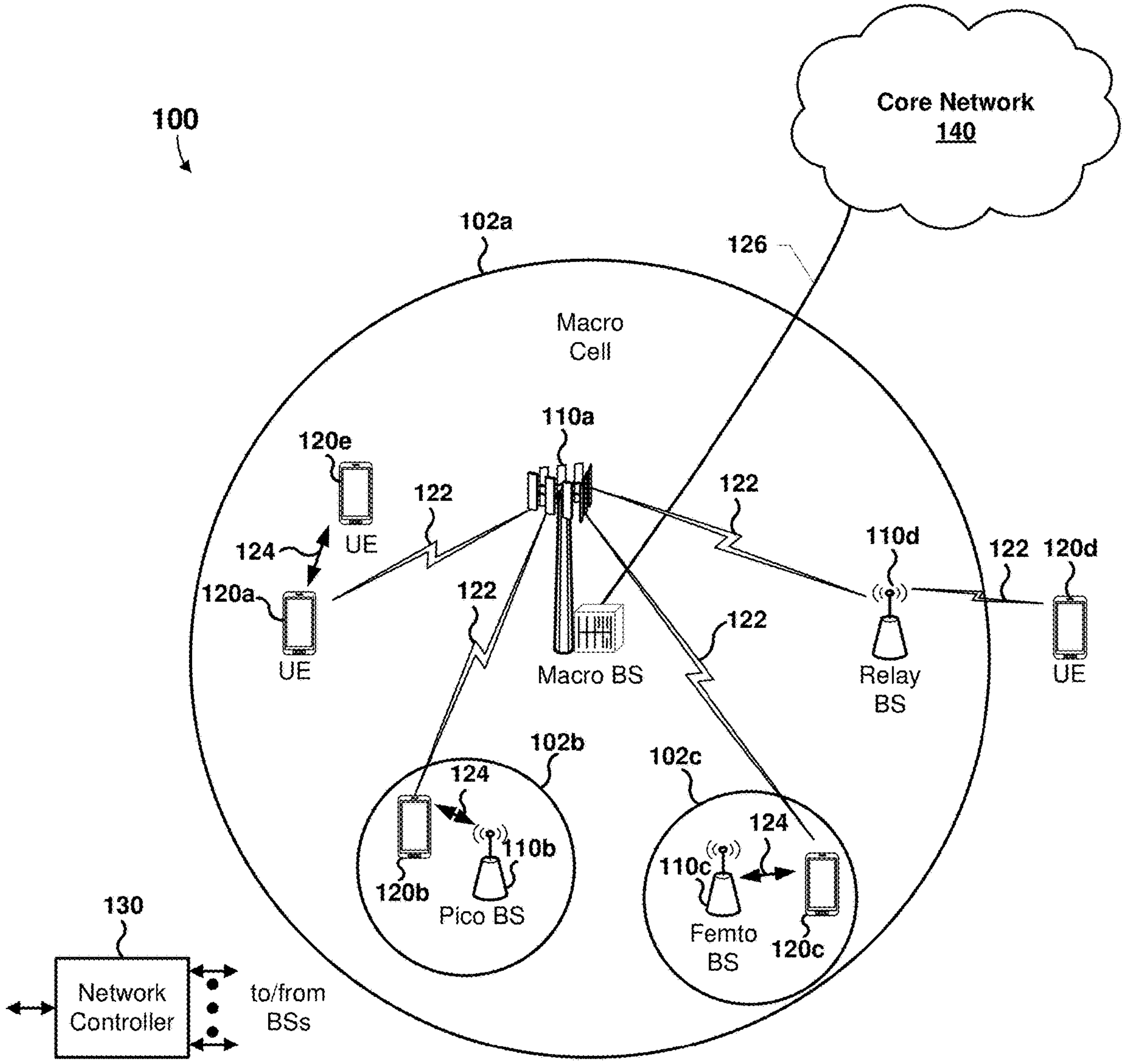
FIG. 1A is a system block diagram illustrating an example communications system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include systems and methods for managing end-to-end QoS in a communication path spanning a first communication network and a second communication network. Various embodiments may enable a network element to determine QoS requirements for a first communication network based on the end-to-end QoS requirements and the achieved QoS of a second communication network, such as a communication path that traverses a 5G network and one or more non-5G networks. Various embodiments may enable a network element to determine the achieved QoS of the second communication network(s) (e.g., the one or more non-5G networks).

Various embodiments include systems and methods for measuring data packet delays in an end-to-end communication path spanning one or more communication networks. In some embodiments, a first computing device may be configured to send to and/or receive messages from a second computing device and determine a data packet delay in a communication path between the first computing device and the second computing device based on timing information related to the messages.

The term "network element" is used herein to refer to any one or all of a computing device that is part of or in communication with a communication network, such as a server, a router, a gateway, a hub device, a switch device, a bridge device, a repeater device, or another electronic device that includes a memory, communication components, and a programmable processor. A wireless device in communication with a network may be considered a network element of such network.

As used herein, the terms "network," "communication network," and "system" may interchangeably refer to a portion or all of a communications network or internetwork. A network may include a plurality of network elements. A network may include a wireless network, and/or may support one or more functions or services of a wireless network.

As used herein, "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (Wi-Fi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices and computing devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

Providing a QoS for an application, service, or data flow that involves communication across two or more networks of different types is complex. A communication network may be able to determine information about, and configure the operations of, its own network elements, including devices communicating with or to those network elements (e.g., devices connected to the communication network). However, a communication network may be unable to obtain information about the operations of other communication networks. For example, an application client of a wireless device may communicate over a communication path with another device (e.g., an application server, or another wireless device). The communication path between the two endpoint devices (the "end-to-end" communication path) may span multiple networks.

As an example, to provide augmented reality application, wireless smart glasses may communicate with (send signals to and receive signals from) an application server over a communication path that spans multiple communication networks. For instance, the smart glasses may communicate with a smart phone over a Wi-Fi network; the smart phone may communicate with a 5G network base station over a cellular communication link; the 5G network may communicate with an internetwork (e.g., the internet); and the internetwork may communicate with a wired network using Ethernet that includes the application server. In this example, the communication path between the smart glasses and the application server spans a Wi-Fi network, a 5G network, an internetwork, and a wired Ethernet network. The augmented reality application of the smart glasses may require a particular QoS to meet one or more application requirements. One network, e.g., the 5G network, may be able to configure its various network elements according to the QoS requirement of the application. However, the 5G network typically has no control over the configuration or operations of network elements of the Wi-Fi network, the internetwork, or the wired Ethernet network.

Various embodiments include methods and network devices configured to perform the methods of managing end-to-end QoS in a communication path spanning a first communication network and a second communication network (which may include one or more other communication networks). For example, the first communication network may include a 5G network, and the second communication network may not be a 5G network. Various operations may be performed by a network element of a communication network functioning as a measurement entity. In various embodiments, a network element of the first communication network may determine an end-to-end QoS requirement for communicating packets from a packet source to a packet destination by the communication path. For example, an application, service, or data flow may request, or may be associated with, a QoS requirement. In various embodiments, the QoS requirement may reflect a performance requirement of the application, service, or data flow. The network element of the first communication network may determine a QoS provided by the second communication network within the communication path. Based on the QoS provided by the second communication network, the network element of the first communication network may configure the first communication network to provide sufficient QoS to support the end-to-end QoS requirement.

In some embodiments, the network element may determine a packet error rate of the second communication network. In such embodiments, the network element may determine a required packet error rate of the first communication network based on the determined packet error rate of the second communication network. The terms "packet error rate" and "packet loss rate" may be used interchangeably herein. In some embodiments, the network elements may determine an available throughput of the second communication network. In such embodiments, the network elements may determine a throughput requirement of the first communication network based on the determined available throughput of the second communication network. In some embodiments, the network element may measure an end-to-end achieved QoS, identify a QoS provided by the first communication network, and determine the QoS provided by the second communication network within the communication path based on the end-to-end achieved QoS and the QoS provided by the first communication network.

In some embodiments, the network element may apply to one or more network elements of the first communication network a 5G QoS Identifier (5QI) that is associated with one or more network element configurations, and/or with one or more measurement operations, to configure the network element(s) to perform operations to enable the network element to determine the QoS provided by the second communication network within the communication path. In some embodiments, any or all of the 5QIs described herein may be defined in a communication standard or technical standard. In some embodiments, a 5QI may be associated with one or more properties or parameters, including at least one of a constant packet delay, a packet delay budget, a packet error rate, a default priority level, a default maximum data burst volume, or another property or parameter.

In some embodiments, the network element may apply a packet delay measurement 5QI that corresponds to a constant packet delay in the first communication network, and may determine the QoS provided by the second communication network within the communication path based on the end-to-end achieved packet delay and the constant packet delay in the first communication network.

In some embodiments, the network element may apply a packet loss rate 5QI that corresponds to a constant packet loss rate in the first communication network, and may determine the QoS provided by the second communication network within the communication path based on the end-to-end achieved packet loss rate and the constant packet loss rate in the first communication network.

In some embodiments, the network element may apply a packet loss rate 5QI associated with a packet loss measurement procedure that excludes packet losses in the first communication network, and may determine the QoS provided by the second communication network within the communication path based on the end-to-end achieved packet loss and the packet loss measurement procedure.

In some embodiments, the network element may apply an available bandwidth 5QI associated with an available bandwidth measurement procedure that configures resources of the first communication network such that a packet loss of the first communication network is substantially negligible relative to a packet loss of the second communication network, and may determine the QoS provided by the second communication network within the communication path based on the end-to-end achieved available bandwidth and the available bandwidth measurement procedure.

In some embodiments, the network element may apply an available bandwidth 5QI associated with an available bandwidth measurement procedure in which data packets are transported in the first communication network back-to-back, and may determine the QoS provided by the second communication network within the communication path based on the end-to-end achieved available bandwidth and the available bandwidth measurement procedure.

In some embodiments, the network element may apply a network measurement 5QI associated with a network measurement procedure for performing end-to-end measurements of measurement packets transported along the communication path, and may determine the QoS provided by the second communication network within the communication path based on the end-to-end achieved QoS and the network measurement procedure.

Various embodiments may improve the operation of a communication network by enabling the configuration of network elements to provide a QoS that meets a QoS requirement for a device, application, or service. Various embodiments may improve the operation of a first communication network by enabling the determination of a QoS provided by another communication network that may include network elements that are not under the control of, or may not otherwise provide information to, the first communication network.

FIG. 1A is a system block diagram illustrating an example communications system 100 suitable for implementing any of the various embodiments. The communications system 100 may be a 5G New Radio (NR) network, or any other suitable network such as a Long Term Evolution (LTE) network. While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 140 and a variety of wireless devices (illustrated as user equipment (UE) 120*a*-120*e* in FIG. 1). The communications system 100 also may include a number of base stations (illustrated as the BS 110*a*, the BS 110*b*, the BS 110*c*, and the BS 110*d*) and other network entities. A base station is an entity that communicates with wireless devices, and also may be referred to as a Node B, an LTE Evolved nodeB (eNodeB or eNB), an access point (AP), a radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 140 may be any type of core network, such as an LTE core network (e.g., an EPC network), 5G core network, etc.

A base station 110*a*-110*d* may provide communication coverage for a macro cell, a pico cell, a femto cell, another type of cell, or a combination thereof. A macro cell may cover a relatively large geographic area (for example, several kilometers in radius) and may allow unrestricted access by wireless devices with service subscription. A pico cell may cover a relatively small geographic area and may allow unrestricted access by wireless devices with service subscription. A femto cell may cover a relatively small geographic area (for example, a home) and may allow restricted access by wireless devices having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110*a* may be a macro BS for a macro cell 102*a*, a base station 110*b* may be a pico BS for a pico cell 102*b*, and a base station 110*c* may be a femto BS for a femto cell 102*c*. A base station 110*a*-110*d* may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110*a*-110*d* may be interconnected to one another as well as to one or more other base stations or network nodes (not illustrated) in the communications system 100 through various types of backhaul interfaces, such as a direct physical connection, a virtual network, or a combination thereof using any suitable transport network The base station 110*a*-110*d* may communicate with the core network 140 over a wired or wireless communication link 126. The wireless device 120*a*-120*e* may communicate with the base station 110*a*-110*d* over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110*d*). A relay station is an entity that can receive a transmission of data from an upstream station (for example, a base station or a wireless device) and send a transmission of the data to a downstream station (for example, a wireless device or a base station). A relay station also may be a wireless device that can relay transmissions for other wireless devices. In the example illustrated in FIG. 1, a relay station 110*d* may communicate with macro the base station 110*a* and the wireless device 120*d* in order to facilitate communication between the base station 110*a* and the wireless device 120*d*. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120*a*, 120*b*, 120*c* may be dispersed throughout communications system 100, and each wireless device may be stationary or mobile. A wireless device also may be referred to as an access terminal, a terminal, a mobile station, a subscriber unit, a station, user equipment (UE), etc.

A macro base station 110*a* may communicate with the communication network 140 over a wired or wireless communication link 126. The wireless devices 120*a*, 120*b*, 120*c* may communicate with a base station 110*a*-110*d* over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, some implementations may be applicable to other wireless communications systems, such as a new radio (NR) or 5G network. NR may utilize OFDM with a cyclic prefix (CP) on the uplink (UL) and downlink (DL) and include support for half-duplex operation using Time Division Duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multilayer transmissions with up to 2 streams per wireless device may be supported. Aggregation of multiple cells may be supported with up to eight serving cells. Alternatively, NR may support a different air interface, other than an OFDM-based air interface.

Some wireless devices may be considered machine-type communication (MTC) or evolved or enhanced machine-type communication (eMTC) wireless devices. MTC and eMTC wireless devices include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some wireless devices may be considered Internet-of-Things (IoT) devices or may be implemented as NB-IoT (narrowband internet of things) devices. The wireless device 120*a*-120*e* may be included inside a housing that houses components of the wireless device 120*a*-120*e*, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

In some implementations, two or more wireless devices 120*a*-120*e* (for example, illustrated as the wireless device 120*a* and the wireless device 120*e*) may communicate directly using one or more sidelink channels 124 (for example, without using a base station 110*a*-110*d* as an intermediary to communicate with one another). For example, the wireless devices 120*a*-120*e* may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120*a*-120*e* may perform scheduling operations, resource selection operations, as well as other operations described elsewhere herein as being performed by the base station 110*a*-110*d*.

Figure 1B:
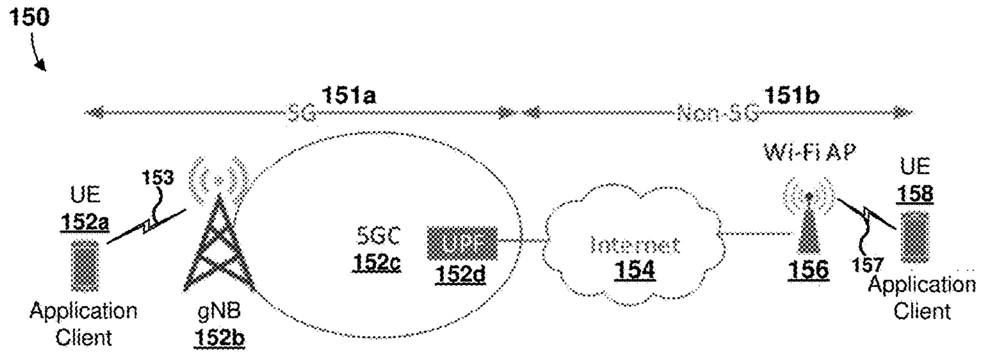
FIGS. 1B-1E are system block diagrams illustrating example communications systems suitable for implementing any of the various embodiments.
Figure 1C:
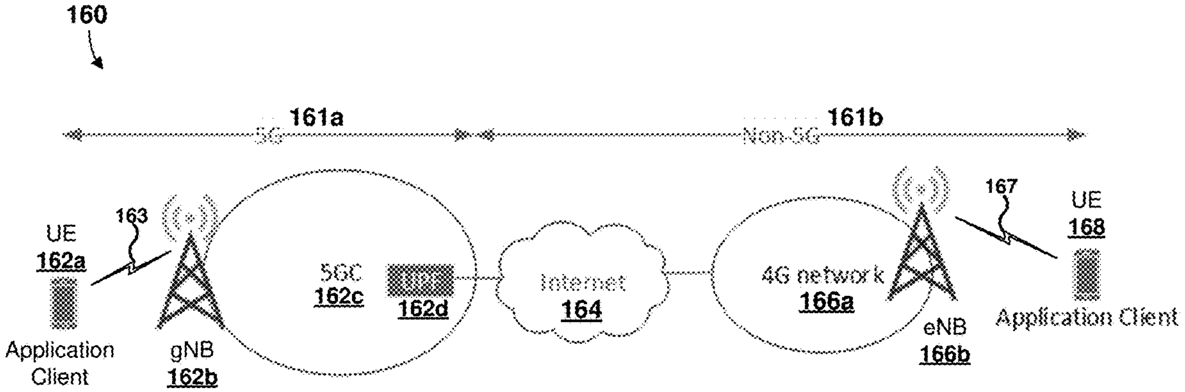
Figure 1D:
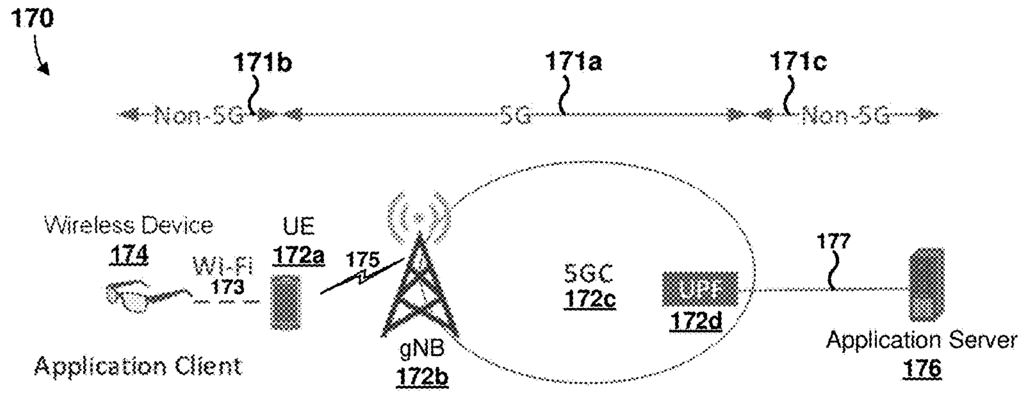

FIGS. 1B-1D are system block diagrams illustrating example communications systems 150, 160, 170, and 180 suitable for implementing any of the various embodiments. With reference to FIGS. 1A-1D, the communications systems 150, 160, 170, and 180 illustrate examples end-to-end communication paths between two endpoint devices that span multiple communication networks. It will be understood that the examples illustrated in communications systems 150, 160, 170, and 180 are non-limiting, and that other implementations of end-to-end communication paths between two endpoint devices that span multiple communication networks are also possible.

Referring to FIG. 1B, an application client executing on a UE 152*a* (e.g., the wireless devices 120*a*-120*e*) may communicate with an application client executing on a UE 158 (e.g., the wireless devices 120*a*-120*e*). The communication path between the UE 152*a* and the UE 158 may span two networks, for example, a 5G network 151*a* and a non-5G network 151*b*. In some embodiments, the 5G network 151*a* may include the UE 152*a* that may communicate with a gNB 152*b* via a cellular communication link 153, a 5G core network 152*c*, and a user plane function (UPF) 152*d* that may enable communication between the 5G network 151*a* and the non-5G network 151*b*. The non-5G network 151*b* may include an internetwork such as the internet 154, a Wi-Fi access point (AP) 156, and the wireless device 158, which may communicate with the Wi-Fi access point 156 via a Wi-Fi wireless communication link 157.

Referring to FIG. 1C, an application client executing on a UE 162*a* (e.g., the wireless devices 120*a*-120*e*) may communicate with an application client executing on a UE 168 (e.g., the wireless devices 120*a*-120*e*). The communication path between the UE 162*a* and the UE 168 may span two networks, for example, a 5G network 161*a* and a non-5G network 161. In some embodiments, the 5G network 161*a* may include the UE 162*a* that may communicate with a gNB 152*b* via a cellular communication link 163, a 5G core network 162*c*, and a user plane function 162*d* that may enable communication between the 5G network 161*a* and the non-5G network 161*b*. The non-5G network 161*b* may include an internetwork such as the internet 164, a 4G network 166*a*, a 4G base station such as an eNB 166*b*, and a wireless device 168, which may communicate with the eNB 166*b* via a 4G wireless communication link 167.

Referring to FIG. 1D, the communication system 170 may include three networks. An application client executing on a wireless device 174 (illustrated as smart glasses) in a first non-5G network 171*b* may communicate with an application server 176 in a second non-5G network 171*c* via a 5G network 171*a*. In this manner, the communication path between the wireless device 174 and the application server 176 may span three communication networks. In some embodiments, the first non-5G network 171*b* may include the wireless device 174, which may communicate with a wireless device (UE) 172*a* via a Wi-Fi communication link 173. The 5G network 171*a* may include the UE 172*a* that may communicate with a gNB 172*b* via a cellular communication link 175, a 5G core network 172*c*, and a user plane function 172*d* that may enable communication between the 5G network 171*a* and the second non-5G network 171*c*. The second non-5G network 171*c* may include the application server 176, which may communicate with the 5G network via a wired communication link 177.

Figure 1E:
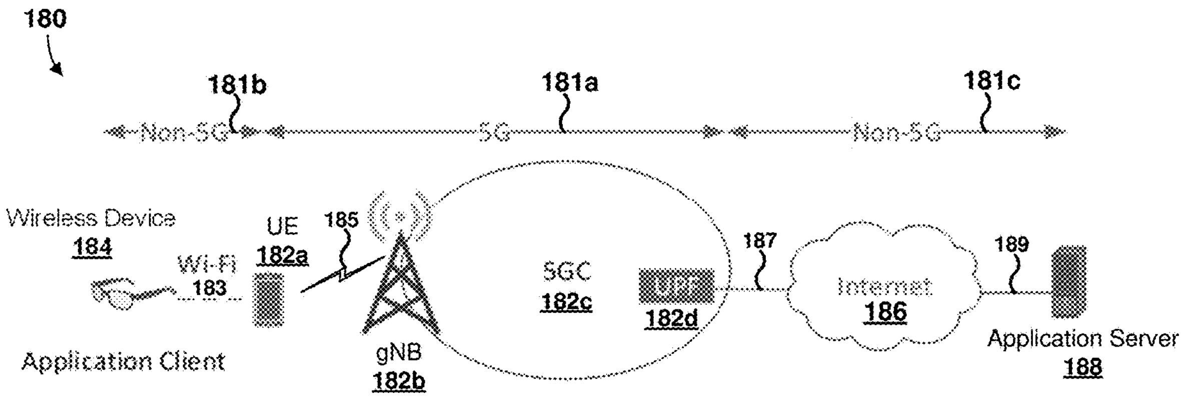

Referring to FIG. 1E, the communication system 180 may include three networks. An application client executing on a wireless device 184 (illustrated as smart glasses) in a first non-5G network 181*b* may communicate with an application server 188 in a second non-5G network 181*c* via a 5G network 181*a*. In this manner, the communication path 189 between the wireless device 184 and the application server 188 may span three communication networks. In some embodiments, the first non-5G network 181*b* may include the wireless device 184, which may communicate with a wireless device (UE) 182*a* via a Wi-Fi communication link 181*b*. The 5G network 181*a* may include the UE 182*a* that may communicate with a gNB 182*b* via a cellular communication link 183, a 5G core network 182*c*, and a user plane function 182*d* that may enable communication between the 5G network 181*a* and the second non-5G network 181*c*. The second non-5G network 181*c* may include an internetwork (such as the internet) 186 that may communicate with the 5G network via a wired communication link 185, and the application server 188, which may communicate with the internetwork 186 via a wired communication link 187.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1 and 2, the illustrated example computing device 200 (which may be a SIP in some embodiments) includes a two SOCs 202, 204 coupled to a clock 206, a voltage regulator 208, and a wireless transceiver 266 configured to send and receive wireless communications via an antenna (not shown) to/from a wireless device (e.g., 120*a*-120*e*) or a base station (e.g., 110*a*-110*d*). In some implementations, the first SOC 202 may operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), and/or very high frequency short wavelength (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (such as CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, some implementations may be implemented in a wide variety of computing systems, which may include a single processor, multiple processors, multicore processors, or any combination thereof.

Figure 3:
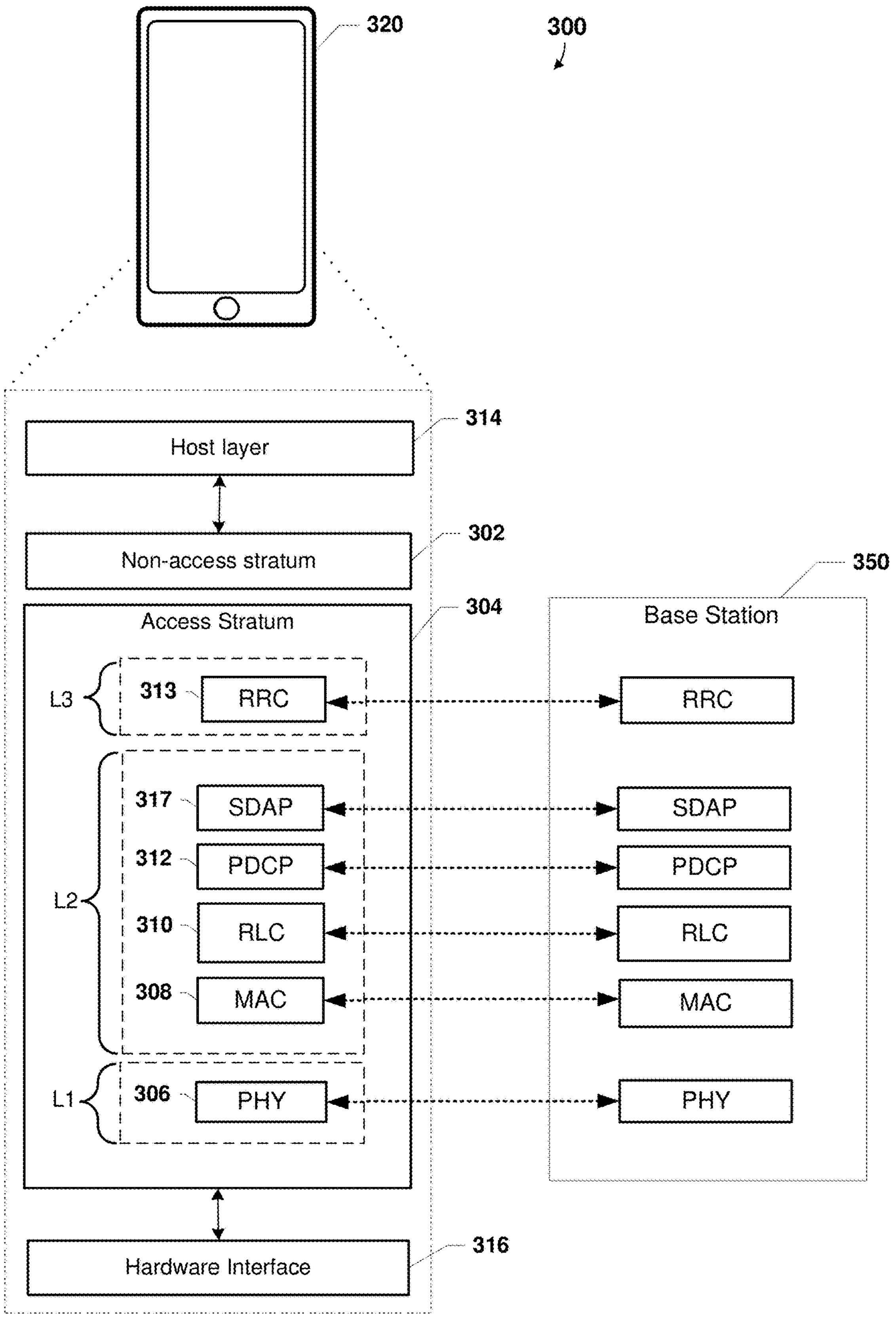
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1-3, the wireless device 320 may implement the software architecture 300 to facilitate communication between a wireless device 320 (e.g., the wireless device 120*a*-120*e*, 200) and the base station 350 (e.g., the base station 110*a*-110*d*) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface via a wireless transceiver (e.g., 266). Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In some implementations, Layer 2 may include a media access control (MAC) sublayer 308, a radio link control (RLC) sublayer 310, and a packet data convergence protocol (PDCP) 312 sublayer, and a Service Data Adaptation Protocol (SDAP) 317 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In some implementations, the RRC sublayer 313 may provide functions including broadcasting system information, paging, and establishing and releasing an RRC signaling connection between the wireless device 320 and the base station 350.

In various embodiments, the SDAP sublayer 317 may provide mapping between Quality of Service (QoS) flows and data radio bearers (DRBs). In some implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as Internet Protocol (IP) layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4:
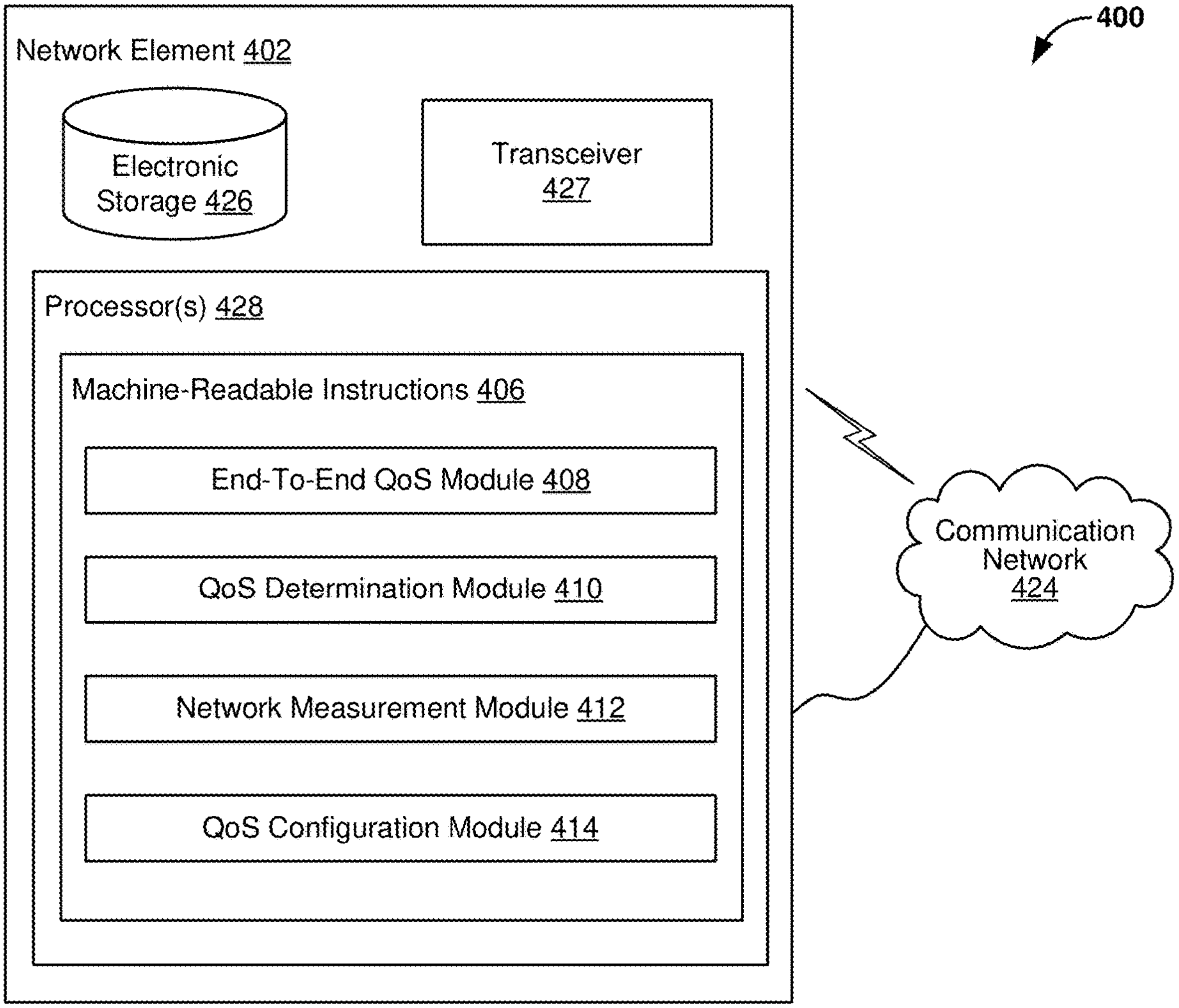
FIG. 4 is a component block diagram illustrating a system configured for managing end-to-end QoS in a communication path spanning a first communication network and a second communication network in accordance with various embodiments.

FIG. 4 is a component block diagram illustrating a system 400 configured for managing end-to-end QoS in a communication path spanning a first communication network and a second communication network in accordance with various embodiments. With reference to FIGS. 1-4, system 400 may include a network element 402 of a 5G network, such as a wireless device (e.g., 110*a*-110*d*, 200, 320), a base station (e.g., 120*a*-120*e*, 200, 350), or another network element of a 5G network, including any network element of the core network 140 or the 5G networks 151*a*, 161*a*, 171*a*, and 181*a*.

The network element 402 may be a computing device (e.g., a server or similar computer) including one or more processors 428 coupled to electronic storage 426 and a transceiver 427 (which may be a wired transceiver and/or a wireless transceiver, e.g., 266). In the network element 402, the transceiver 427 may be configured to receive messages sent in transmissions and pass such message to the processor(s) 428 for processing. Similarly, the processor 428 may be configured to send messages for transmission to the transceiver 427 for transmission. The network element 402 may send or receive messages to or from a communication network 424 via a wired and/or wireless communication link.

Referring to the base station 402, the processor(s) 428 may be configured by machine-readable instructions 406. Machine-readable instructions 406 may include one or more instruction modules. The instruction modules may include computer program modules. The instruction modules may include one or more of an end-to-end QoS module 408, a QoS determination module 410, a network measurement module 412, a QoS configuration module 414, or other instruction modules.

The end-to-end QoS module 408 may be configured to determine an end-to-end QoS requirement for communicating packets from a packet source to a packet destination by the communication path.

The QoS determination module 410 may be configured to determine a QoS provided by the second communication network within the communication path. The QoS determination module 410 may be configured to determine a packet error rate of the second communication network. The QoS determination module 410 may be configured to determine an available throughput of the second communication network. The QoS determination module 410 may be configured to measure an end-to-end achieved QoS, identify a QoS provided by the first communication network, and determine the QoS provided by the second communication network within the communication path based on the end-to-end achieved QoS and the QoS provided by the first communication network.

The network measurement module 412 may be configured to apply to the first communication network a packet delay measurement 5QI that corresponds to a constant packet delay in the first communication network, and determine the QoS provided by the second communication network within the communication path based on the end-to-end achieved QoS and the constant packet delay in the first communication network. In some embodiments, the network measurement module 412 may be configured to apply to the first communication network a packet loss rate 5QI that corresponds to a constant packet loss rate in the first communication network, and determine the QoS provided by the second communication network within the communication path based on the end-to-end achieved QoS and the constant packet loss rate in the first communication network. In some embodiments, the network measurement module 412 may be configured to apply to the first communication network a packet loss rate 5QI associated with a packet loss measurement procedure that excludes packet losses in the first communication network, and determine the QoS provided by the second communication network within the communication path based on the end-to-end achieved QoS and the packet loss measurement procedure.

In some embodiments, the network measurement module 412 may be configured to apply to the first communication network an available bandwidth 5QI associated with an available bandwidth measurement procedure that configures resources of the first communication network such that a packet loss of the first communication network is substantially negligible relative to a packet loss of the second communication network, and determine the QoS provided by the second communication network within the communication path based on the end-to-end achieved QoS and the available bandwidth measurement procedure. In some embodiments, the network measurement module 412 may be configured to apply to the first communication network an available bandwidth 5QI associated with an available bandwidth measurement procedure in which data packets are transported in the first communication network back-to-back, and determine the QoS provided by the second communication network within the communication path based on the end-to-end achieved QoS and the available bandwidth measurement procedure. In some embodiments, the network measurement module 412 may be configured to apply to the first communication network a network measurement 5QI associated with a network measurement procedure for performing end-to-end measurements of measurement packets transported along the communication path, and determine the QoS provided by the second communication network within the communication path based on the end-to-end achieved QoS and the network measurement procedure. In some aspects, the measurements packets may be test packets, probe packets, or packets of the application between the two end-point devices.

The QoS configuration module 414 may be configured to configure the first communication network to provide sufficient QoS to support the end-to-end QoS requirement based on the QoS provided by the second communication network. The QoS configuration module 414 may be configured to determine a required packet error rate of the first communication network based on the determined packet error rate of the second communication network. QoS configuration module 414 may be configured to determine a throughput requirement of the first communication network based on the determined available throughput of the second communication network.

The electronic storage 426 may include non-transitory storage media that electronically stores information. The electronic storage media of electronic storage 426 may include one or both of system storage that is provided integrally (i.e., substantially non-removable) with the network element 402 and/or removable storage that is removably connectable to the network element 402 via, for example, a port (e.g., a universal serial bus (USB) port, a firewire port, etc.) or a drive (e.g., a disk drive, etc.). Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). Electronic storage 426 may store software algorithms, information determined by processor(s) 428, information received from the network element 402, or other information that enables the network element 402 to function as described herein.

Processor(s) 428 may be configured to provide information processing capabilities in the network element 402. As such, the processor(s) 428 may include one or more of a digital processor, an analog processor, a digital circuit designed to process information, an analog circuit designed to process information, a state machine, and/or other mechanisms for electronically processing information. Although the processor(s) 428 are illustrated as single entities, this is for illustrative purposes only. In some embodiments, the processor(s) 428 may include a plurality of processing units and/or processor cores. The processing units may be physically located within the same device, or processor(s) 428 may represent processing functionality of a plurality of devices operating in coordination. The processor(s) 428 may be configured to execute modules 408-414 and/or other modules by software; hardware; firmware; some combination of software, hardware, and/or firmware; and/or other mechanisms for configuring processing capabilities on processor(s) 428. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-414 described below is for illustrative purposes, and is not intended to be limiting, as any of modules 408-414 may provide more or less functionality than is described. For example, one or more of the modules 408-414 may be eliminated, and some or all of its functionality may be provided by other modules 408-414. As another example, the processor(s) 428 may be configured to execute one or more additional modules that may perform some or all of the functionality attributed below to one of the modules 408-414.

Figure 5:
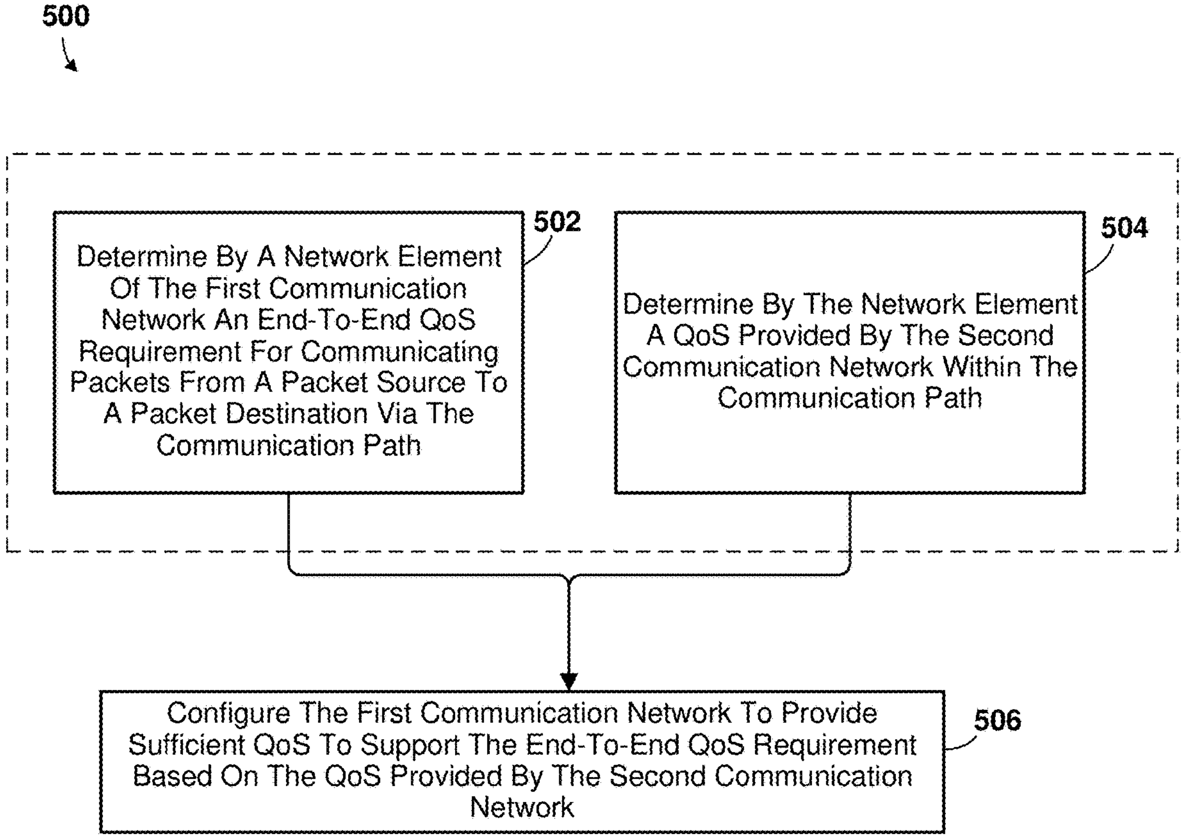
FIG. 5 is a process flow diagram illustrating a method performed by a processor of a network element for enhancing coverage for initial access according to various embodiments.

FIG. 5 is a process flow diagram illustrating a method 500 performed by a processor of a computing device functioning as a network element for enhancing coverage for initial access according to various embodiments. With reference to FIGS. 1-5, the operations of the method 500 may be performed by a processor (such as the processor 210, 212, 214, 216, 218, 252, 260, 428) of a computing device configured to function as a network element (e.g., 402) of the core network 140 or the 5G networks 151*a*, 161*a*, 171*a*, and 181*a*, a base station device (such as the base station 110*a*-110*d*, 200, 350, or a wireless device (e.g., 110*a*-110*d*, 200, 320).

In various embodiments, the processor may perform the operations of blocks 502 and 504 in any order, or substantially simultaneously (indicated by the dashed box).

In block 502, the processor may determine an end-to-end QoS requirement for communicating packets from a packet source to a packet destination via the communication path. In some embodiments, the communication path may span two or more communication networks, such as a first communication network and a second communication network. In some embodiments, the first communication network may include a 5G network and the second communication network may include a non-5G network. In some embodiments, the processor may determine an end-to-end QoS requirement associated with an application or application client executing on an endpoint device (e.g., 152*a*, 162*a*, 172*a*, 182*a*). In some embodiments, the processor may receive the message from an application or application client including the end-to-end QoS requirement. In some embodiments, the processor may determine the end-to-end QoS requirement based on one or more messages from the application, application client, and/or endpoint device. Means for performing the operations of block 502 may include the processor 210, 212, 214, 216, 218, 252, 260, 428 of a computing device functioning as a network element, the wireless transceiver 266, the transceiver 427, and the end-to-end QoS module 408.

In block 504, the processor may determine a QoS provided by the second communication network within the communication path. In some embodiments, the processor may determine a packet error rate of the second communication network. In some alignments, the processor may determine an available throughput of the second communication network. In some embodiments, the processor may measure an end-to-end achieved QoS, identify a QoS provided by the first communication network, and determine the QoS provided by the second communication network within the communication path based on the end-to-end achieved QoS and the QoS provided by the first communication network. Means for performing the operations of block 504 may include the processor 210, 212, 214, 216, 218, 252, 260, 428 of a computing device functioning as a network element, the wireless transceiver 266, the transceiver 427, and the QoS determination module 410.

In block 506, the processor may configure the first communication network to provide sufficient QoS to support the end-to-end QoS requirement based on the QoS provided by the second communication network. In some embodiments, the processor may send one or more messages to one or more network elements of the first communication network to configure operations of the one or more network elements of the first communication network to perform QoS operations to provide sufficient QoS to support the end-to-end QoS requirement. Means for performing the operations of block 506 may include the processor 210, 212, 214, 216, 218, 252, 260, 428 of a computing device functioning as a network element, the wireless transceiver 266, the transceiver 427, and the QoS configuration module 414.

FIGS. 6A-6I are process flow diagrams illustrating operations 600*a*-600*i* that may be performed by a processor of a computing device configured to function as a network element as part of the method 500 for managing end-to-end QoS in a communication path spanning a first communication network and a second communication network according to various embodiments. FIGS. 6J and 6K are conceptual diagrams illustrating example packet loss measurements. FIG. 6L is a conceptual diagram illustrating an example available bandwidth measurement. With reference to FIGS. 1-6L, the operations 600*a*-600*i* may be performed by a processor (such as the processor 210, 212, 214, 216, 218, 252, 260, 428) of a network element (e.g., 402) of the core network 140 or the 5G networks 151*a*, 161*a*, 171*a*, and 181*a*, a base station device (such as the base station 110*a*-110*d*, 200, 350, or a wireless device (e.g., 110*a*-110*d*, 200, 320).

Figure 6A:
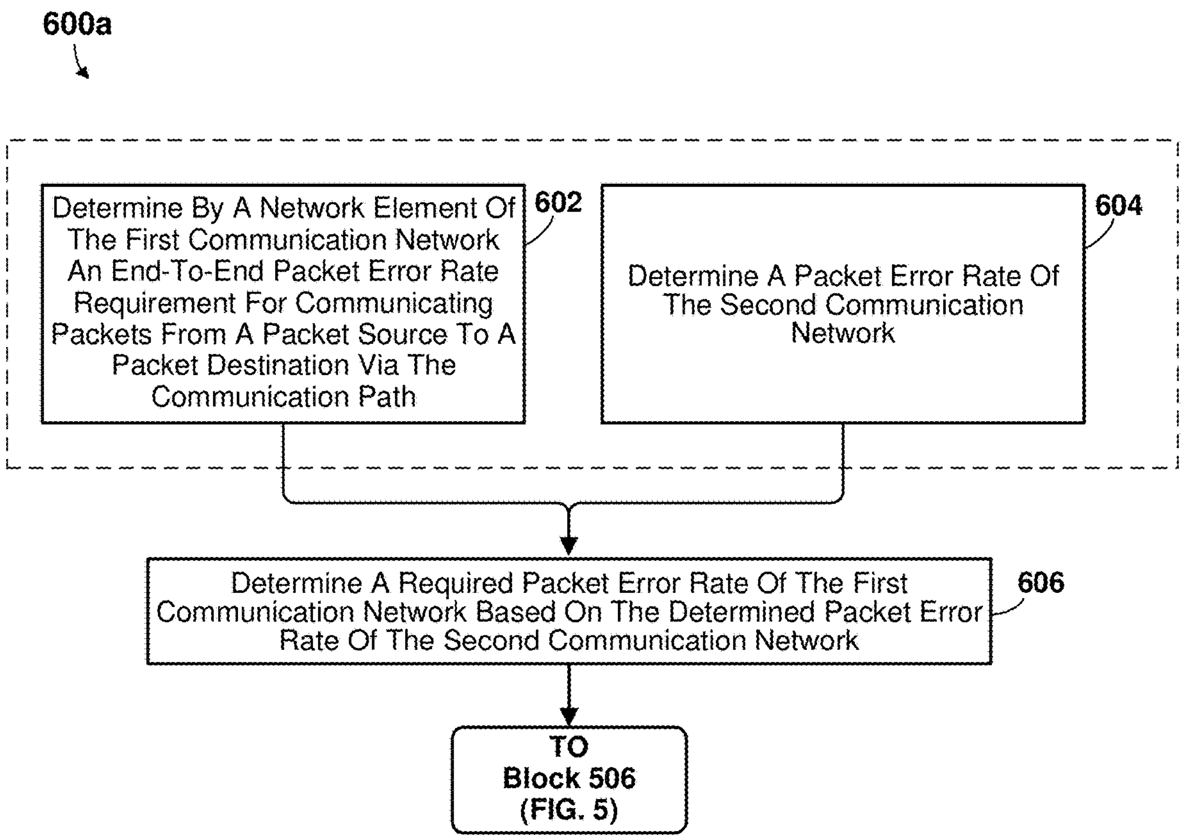
FIGS. 6A-6I are process flow diagrams illustrating operations that may be performed by a processor of a network element as part of the method for managing end-to-end QoS in a communication path spanning a first communication network and a second communication network according to various embodiments.

Referring to FIG. 6A, blocks 602 and 604 are examples of operations that may be performed as part of the blocks 502 and 504 in FIG. 5, respectively. In various embodiments, the processor may perform the operations of blocks 602 and 604 in any order, or substantially simultaneously (indicated by the dashed box).

In block 602, the processor may determine an end-to-end packet error rate for communicating packets from a packet source to a packet destination via the communication path. In some embodiments, the communication path may span two or more communication networks, such as a first communication network and a second communication network. In some implementations, the first communication network and the second communication network may be different types of networks and/or implement different communication protocols (e.g., a 5G network and a non-5G network). Means for performing the operations of block 602 may include the processor 210, 212, 214, 216, 218, 252, 260, 428 of a computing device functioning as a network element, the wireless transceiver 266, the transceiver 427, and the end-to-end QoS module 408.

In block 604, the processor may determine a packet error rate of the second communication network in block 602. Means for performing the operations of block 604 may include the processor 210, 212, 214, 216, 218, 252, 260, 428 of a computing device functioning as a network element, the wireless transceiver 266, the transceiver 427, and the network measurement module 410.

In block 606, the processor may determine a required packet error rate of the first communication network based on the determined packet error rate of the second communication network. Means for performing the operations of block 606 may include the processor 210, 212, 214, 216, 218, 252, 260, 428 of a computing device functioning as a network element, the wireless transceiver 266, the transceiver 427, and the QoS determination module 410.

The processor may then configure the first communication network to provide sufficient QoS to support the end-to-end QoS requirement based on the QoS provided by the second communication network in block 506 of the method 500 as described.

Figure 6B:
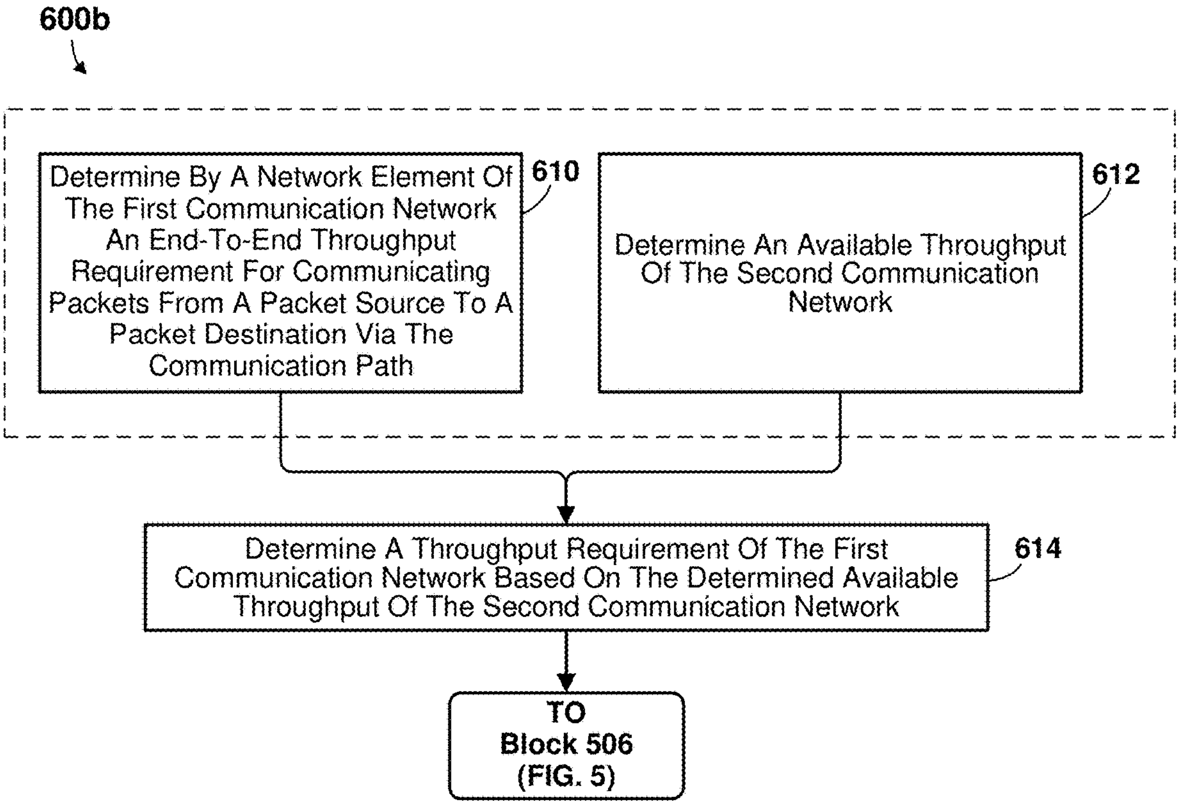

Referring to FIG. 6B, blocks 610 and 612 are examples of operations that may be performed as part of the blocks 502 and 504 in FIG. 5, respectively. In various embodiments, the processor may perform the operations of blocks 610 and 612 in any order, or substantially simultaneously (indicated by the dashed box).

In block 610, the processor may determine an end-to-end throughput requirement for communicating packets from a packet source to a packet destination via the communication path. In some embodiments, the communication path may span two or more communication networks, such as a first communication network and a second communication network. In some implementations, the first communication network and the second communication network may be different types of networks and/or implement different communication protocols (e.g., a 5G network and a non-5G network). Means for performing the operations of block 610 may include the processor 210, 212, 214, 216, 218, 252, 260, 428 of a computing device functioning as a network element, the wireless transceiver 266, the transceiver 427, and the end-to-end QoS module 408.

In block 612, the processor may determine an available throughput of the second communication network in block 610. Means for performing the operations of block 612 may include the processor 210, 212, 214, 216, 218, 252, 260, 428 of a computing device functioning as a network element, the wireless transceiver 266, the transceiver 427, and the network measurement module 410.

In block 614, the processor may determine a throughput requirement of the first communication network based on the determined available throughput of the second communication network. Means for performing the operations of block 614 may include the processor 210, 212, 214, 216, 218, 252, 260, 428 of a computing device functioning as a network element, the wireless transceiver 266, the transceiver 427, and the QoS determination module 410.

The processor may then configure the first communication network to provide sufficient QoS to support the end-to-end QoS requirement based on the QoS provided by the second communication network in block 506 of the method 500 as described.

Figure 6C:
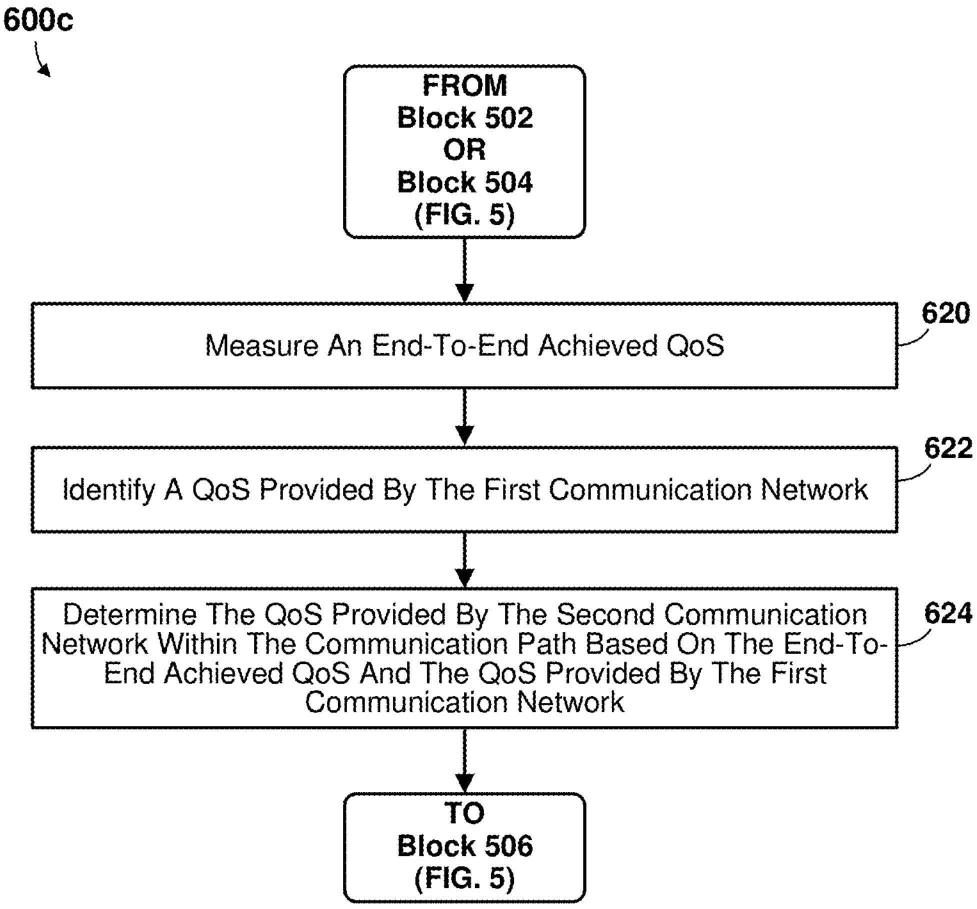

Referring to FIG. 6C, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may measure an end-to-end achieved QoS in block 620. In some embodiments, the processor may perform one or more measurements of packet delay, packet loss, packet departure and arrival time, packet dispersal, and/or another measurement to determine the QoS achieved (provided by) the end-to-end communication path (e.g., from one endpoint to another endpoint) that spans the first communication network and the second communication network. Means for performing the operations of block 620 may include the processor 210, 212, 214, 216, 218, 252, 260, 428 of a computing device functioning as a network element, the wireless transceiver 266, the transceiver 427, and the network measurement module 410.

In block 622, the processor may identify a QoS provided by the first communication network. In some embodiments, the processor may determine the QoS provided by the first communication network. In some embodiments, the processor may select a QoS to be provided by the first communication network. In some embodiments, the processor may identify, select, or set the QoS provided by the first communication network to be substantially constant or substantially invariant. Means for performing the operations of block 622 may include the processor 210, 212, 214, 216, 218, 252, 260, 428 of a computing device functioning as a network element, the wireless transceiver 266, the transceiver 427, and the QoS determination module 410.

In block 624, the processor may determine the QoS provided by the second communication network within the communication path based on the end-to-end achieved QoS and the QoS provided by the first communication network. In some embodiments, by configuring operations of one or more network elements of the first communication network to provide a substantially constant or substantially invariant QoS, the processor may determine the QoS provided by the second communication network within the communication path as a function of the end-to-end achieved QoS and the substantially constant or substantially invariant QoS provided by the first communication network. Means for performing the operations of block 624 may include the processor 210, 212, 214, 216, 218, 252, 260, 428 of a computing device functioning as a network element, the wireless transceiver 266, the transceiver 427, and the QoS determination module 410.

The processor may then configure the first communication network to provide sufficient QoS to support the end-to-end QoS requirement based on the QoS provided by the second communication network in block 506 of the method 500 as described.

Figure 6D:
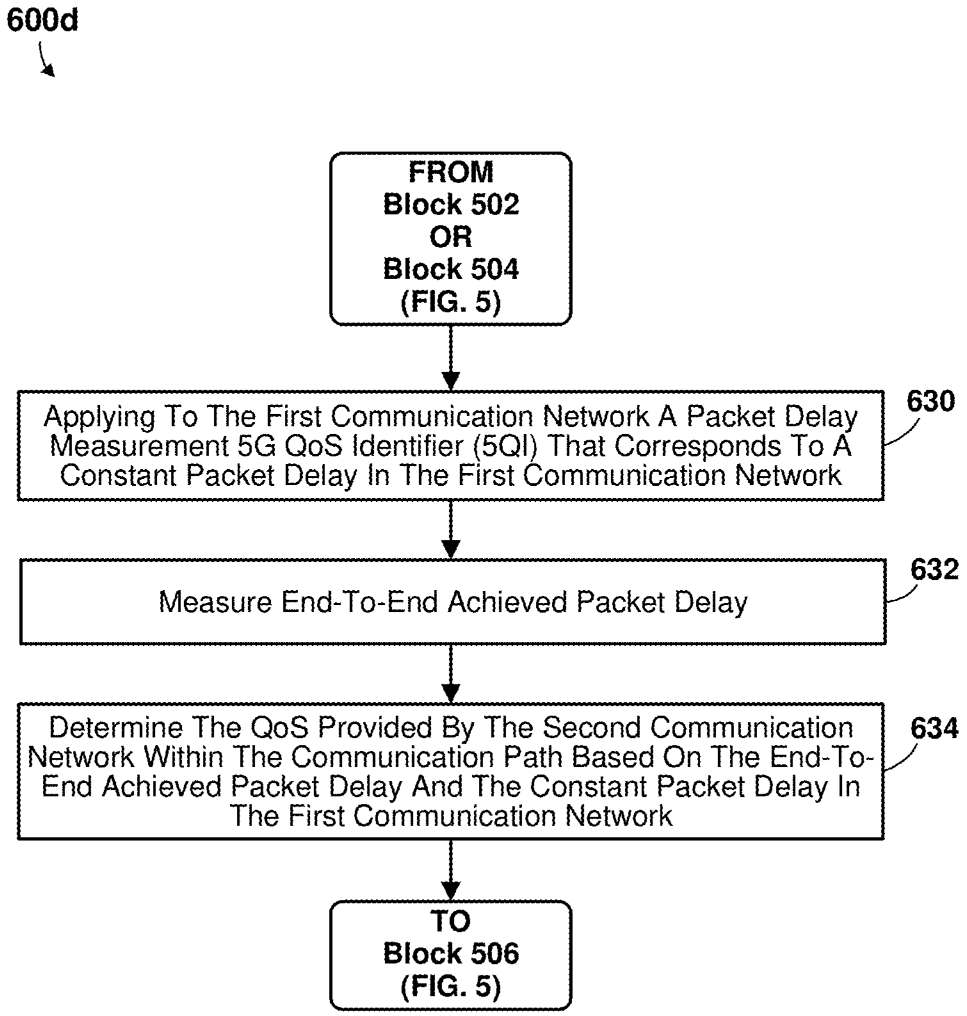

Referring to FIG. 6D, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may apply to the first communication network a packet delay measurement 5G QoS Identifier (5QI) that corresponds to a constant packet delay in the first communication network in block 630. In some embodiments, a packet delay measurement 5QI may be configured and associated with operations that provide a substantially constant or substantially invariant packet delay to packets processed by and/or transported by the first communication network. In some embodiments, in response to the packet delay measurement 5QI, one or more network elements of the first communication network may be configured to provide substantially constant packet delay to packets processed by and/or transported by the network elements of the first communication network. In some embodiments, the one or more network elements of the first communication network may include a base station (which may include a Medium Access Control (MAC) scheduler, a routing function, etc.), one or more intermediate nodes, and a user plane function. Means for performing the operations of block 630 may include the processor 210, 212, 214, 216, 218, 252, 260, 428 of a computing device functioning as a network element, the wireless transceiver 266, the transceiver 427, and the QoS configuration module 414.

In block 632, the processor may measure an end-to-end achieved packet delay. Means for performing the operations of block 632 may include the processor 210, 212, 214, 216, 218, 252, 260, 428 of a computing device functioning as a network element, the wireless transceiver 266, the transceiver 427, and the network measurement module 412.

In block 634, the processor may determine the QoS provided by the second communication network within the communication path based on the end-to-end achieved packet delay and the constant packet delay in the first communication network. In some embodiments, measurement packets may be sent end-to-end along the communication path that spans multiple communication networks (e.g., the first communication network and the second communication network). In some embodiments, the processor may determine a packet delay of the second communication network based on an end-to-end packet delay and the substantially constant packet delay provided by the first communication network. In some embodiments, the packet delay provided by (incurred by, caused by, related to) the second communication network may be represented as Dn=De2e−Dc, in which Dn represents the packet delay of the second communication network (which may be a non-5G communication network), De2e represents the end-to-end packet delay, and Dc represents the substantially constant packet delay of the first communication network. Means for performing the operations of block 634 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

Figure 6E:
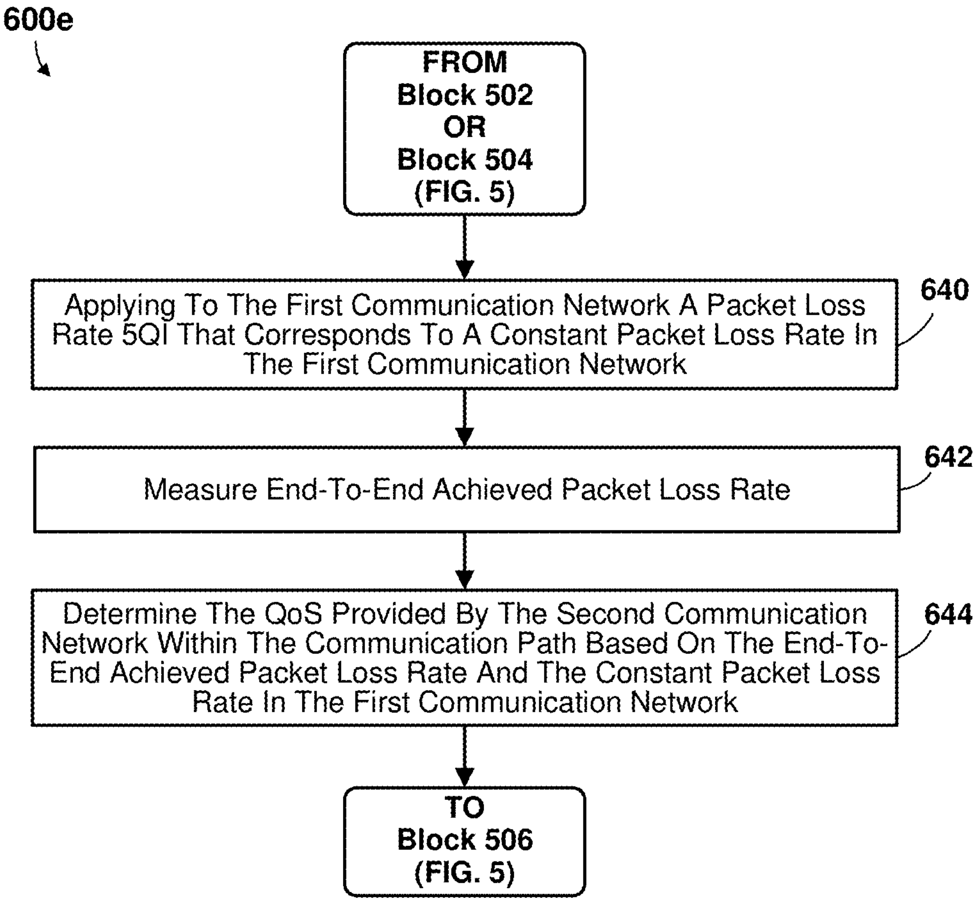

Referring to FIG. 6E, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may apply to the first communication network a packet loss rate 5QI that corresponds to a constant packet loss rate in the first communication network in block 640. In some embodiments, a packet loss rate 5QI may be configured and associated with operations that provide a substantially constant or substantially invariant packet loss rate to packets processed by and/or transported by the first communication network. In some embodiments, in response to the packet loss rate measurement 5QI, one or more network elements of the first communication network may be configured to provide the substantially constant packet loss rate to packets processed by and/or transported by the network elements of the first communication network. Means for performing the operations of block 640 may include the processor 210, 212, 214, 216, 218, 252, 260, 428 of a computing device functioning as a network element, the wireless transceiver 266, the transceiver 427, and the QoS configuration module 414.

In block 642, the processor may measure an end-to-end achieved packet loss rate. Means for performing the operations of block 642 may include the processor 210, 212, 214, 216, 218, 252, 260, 428 of a computing device functioning as a network element, the wireless transceiver 266, the transceiver 427, and the network measurement module 412.

In block 644, the processor may determine the packet loss rate provided by the second communication network within the communication path based on the end-to-end achieved packet loss rate and the constant packet loss rate in the first communication network. In some embodiments, measurement packets may be sent end-to-end along the communication path that spans multiple communication networks. In some embodiments, the processor may determine a packet loss rate of the second communication network based on an end-to-end packet loss rate and the substantially constant packet loss rate incurred by (caused by, related to, provided by) the first communication network. In some embodiments, the packet loss rate provided by the second communication network may be represented as:

$$p_n = \frac{p_{e2e} - p_c}{1 - p_c}$$

in which Pn represents the packet loss rate of the second communication network (which may be a non-5G communication network), Pe2e represents the end-to-end packet loss rate, and Pc represents the substantially constant packet loss rate provided by the first communication network. Means for performing the operations of block 644 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

Figure 6F:
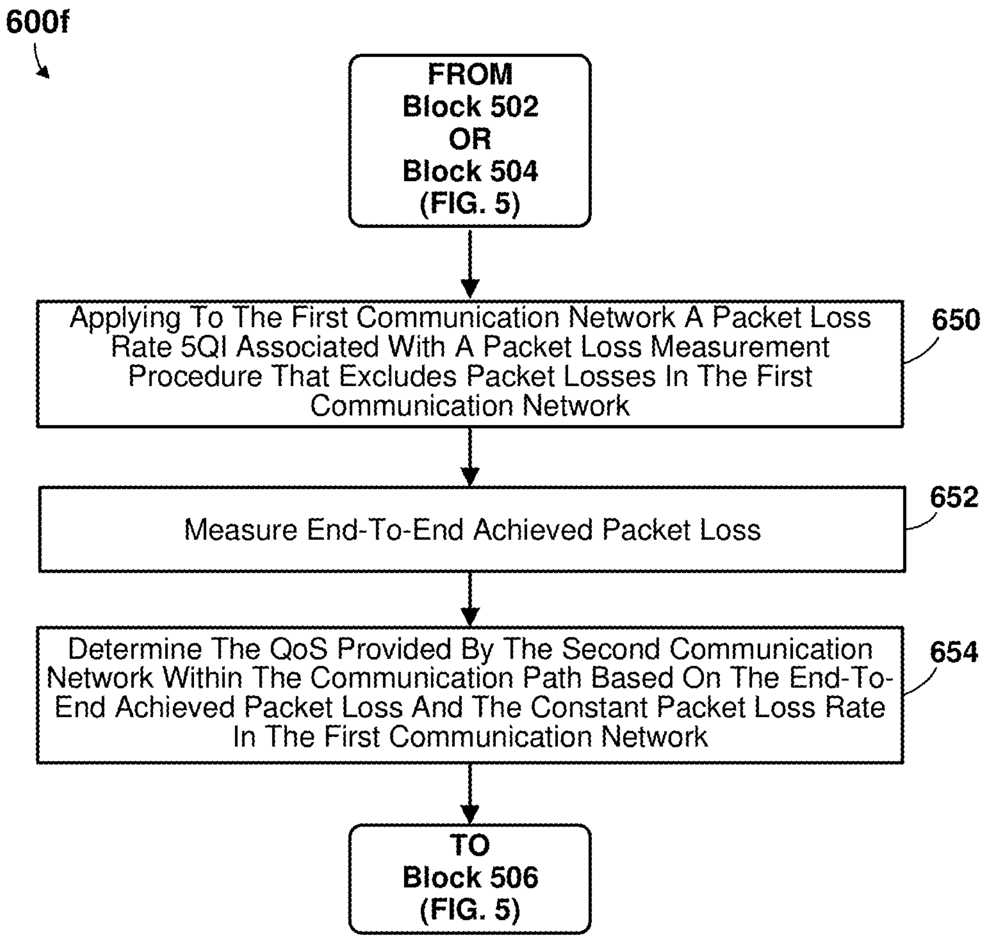

Referring to FIG. 6F, before measuring an end-to-end achieved QoS in block 620 as described, the processor may apply to the first communication network a packet loss rate 5QI associated with a packet loss measurement procedure that excludes packet losses in the first communication network. In some embodiments, a packet loss rate 5QI may be configured and associated with operations that provide a substantially constant or substantially invariant packet loss rate to packets processed by and/or transported by the first communication network. In some embodiments, in response to the packet loss rate measurement 5QI, one or more network elements of the first communication network may be configured to provide the substantially constant packet loss rate to packets processed by and/or transported by the network elements of the first communication network. Means for performing the operations of block 650 may include the processor 210, 212, 214, 216, 218, 252, 260, 428 of a computing device functioning as a network element, the wireless transceiver 266, the transceiver 427, and the QoS configuration module 414.

In block 652, the processor may measure an end-to-end achieved packet loss. Means for performing the operations of block 652 may include the processor 210, 212, 214, 216, 218, 252, 260, 428 of a computing device functioning as a network element, the wireless transceiver 266, the transceiver 427, and the network measurement module 412.

In block 654, the processor may determine the QoS provided by the second communication network within the communication path based on the end-to-end achieved packet loss and the packet loss measurement procedure. In some embodiments, measurement packets may be sent end-to-end along the communication path that spans multiple communication networks. In some embodiments, the processor may measure packet losses at multiple points along the communication path, and may perform one or more operations to exclude packet losses in the first communication network.

For example, referring to FIG. 6J, an application client 690*a* (e.g., executing on the wireless device) 174 may transmit during a first time period a number of packets N1 addressed to an application server 690*e* (e.g., 176, 188). An intermediate device, such as a UE 690*b* (e.g., the UE 172*a*, 182*a*) may receive during a second time period a number of packets N2. The second time period may include the same duration as the first time period and may have a first time offset (e.g., the second time period may be later than the first time period by the first time offset). The first time offset may be based on the delay (e.g., that a packet would experience) from the application client 690*a* to the intermediate device UE 690*b*. A network element of the 5G core network, such as a UPF 690*d* (e.g., the UPF 172*d* or another network element of the 5G core network 172*c*) may receive during a third time period a number of packets N3. In some embodiments, the number of packets N3 may reflect packet loss at one or more network elements, such as at a gNB 690*c*. The third time period may include the same duration as the first time period and the second time period and may have a second time offset (e.g., the third time period may be later than the second time period by the second time offset). The application server 690*e* may receive during a fourth time period a number of packets N4. The fourth time period may include the same duration as the first, second, and third time periods and may have a third time offset (e.g., the fourth time period may be later than the third time period by the third time offset). In this example, the packet loss incurred by (provided by, related to) the second communication network (or in this example, the second communication networks 171*b* and 171*c*) may be represented as:

$$p_n = \frac{N1 - N2 + (N3 - N4)}{N1 - (N2 - N3)}$$

in which Pn represents the packet loss rate of the second communication network(s). In this manner, the processor may determine the packet loss rate attributable to the second communication network(s) by a packet loss measurement procedure that excludes packet losses in the first communication network.

In various embodiments, the packet loss rate at greater or fewer points along the communication path (i.e., greater or fewer Ns may be measured) depending on a network's configuration. For example, a packet loss rate between two nearby or close network elements (e.g., a UE co-located with a base station) may not be measured.

As another example, referring to FIG. 6K, a UE 692*a* (e.g., the UE 152*a*, 162*a*, 172*a*, 182*a*) may be co-located with an application client. In some embodiments, the application client may be executing on the UE 692*a* (e.g., the UE 152*a*, 162*a*), and the UE 692*a* may be located proximate to a device executing the application client (e.g., the wireless device 174, 184). In this example, the UE 692*a* may transmit during a first time period a number of packets N1 addressed to an application server 692*de* (e.g., 158, 168). An intermediate device, such as a UPF 692*c* (e.g., the UPF 152*d*, 162*d*) may receive a number of packets N2 during a second time period. The second time period may be the same duration as the first time period and may have a first time offset (e.g., the second time period may be later than the first time period by the first time offset). The first time offset may be based on the delay (e.g., that a packet would experience) from the UE 692*a* to the intermediate device UPF 692*c*. In some embodiments, the number of packets N2 may reflect packet loss at one or more network elements, such as at a gNB 692*b*. The application server 692*d* may receive during a third time period a number of packets N3. The third time period may be the same duration as the first and second time periods and may have a third time offset (e.g., the third time period may be later than the second time period by the second time offset). In this example, the packet loss incurred by (provided by, related to) the second communication network (or in this example, the second communication networks 171*b* and 171*c*) may be represented as:

$$p_n = \frac{N2 - N3}{N2}$$

in which Pn represents the packet loss rate of the second communication network(s). In this manner, the processor may determine the packet loss rate attributable to the second communication network(s) by a packet loss measurement procedure that excludes packet losses in the first communication network. Means for performing the operations of block 652 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

Figure 6G:
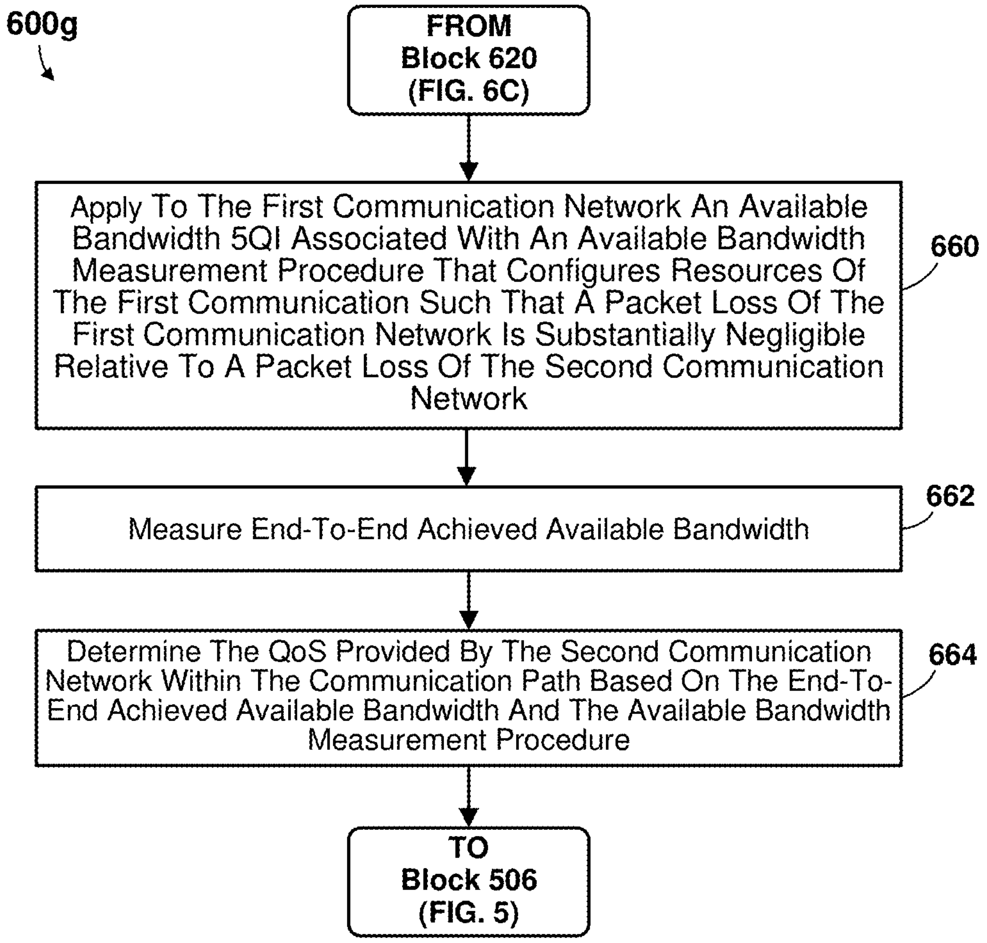

Referring to FIG. 6G, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may apply to the first communication network an available bandwidth 5QI associated with an available bandwidth measurement procedure that configures resources of the first communication network such that a packet loss of the first communication network is substantially negligible relative to a packet loss of the second communication network in block 660.

In some embodiments, an available bandwidth 5QI may be configured and associated with operations that provide a substantially negligible packet loss in the first network relative to packets processed by and/or transported by the second communication network. In some embodiments, in response to the available bandwidth measurement 5QI, one or more network elements of the first communication network may be configured to process and/or transport packets in a manner that provides the substantially negligible packet loss. For example, the processor may "overprovision" transport and/or processing resources of the first communication network such that network element(s) of the first communication network provide no bottleneck to the end-to-end communication path relative to the second communication network. In some embodiments, the network elements of the first communication network may be provisioned in this manner for a relatively short period of time, such as for a duration of one or more a measurement operations. Means for performing the operations of block 660 may include the processor 210, 212, 214, 216, 218, 252, 260, 428 of a computing device functioning as a network element, the wireless transceiver 266, the transceiver 427, and the QoS configuration module 414.

In block 662, the processor may measure an end-to-end achieved available bandwidth. Means for performing the operations of block 662 may include the processor 210, 212, 214, 216, 218, 252, 260, 428 of a computing device functioning as a network element, the wireless transceiver 266, the transceiver 427, and the network measurement module 412.

In block 664, the processor may determine the QoS provided by the second communication network within the communication path based on the end-to-end achieved available bandwidth and the available bandwidth measurement procedure. For example, while the network element(s) of the first communication network are configured to provide the substantially negligible packet loss in the first network, the processor may measure an end-to-end available bandwidth, data rate, and/or bit rate. In such embodiments, the processor may determine the bandwidth, data rate, and/or bit rate of the second network to be substantially the same as the measured bandwidth, data rate, and/or bit rate. In some embodiments, this approach may be particularly useful for determining an available bandwidth for User Datagram Protocol (UDP) traffic flows or Transport Control Protocol (TCP) traffic flows. Means for performing the operations of block 664 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

Figure 6H:
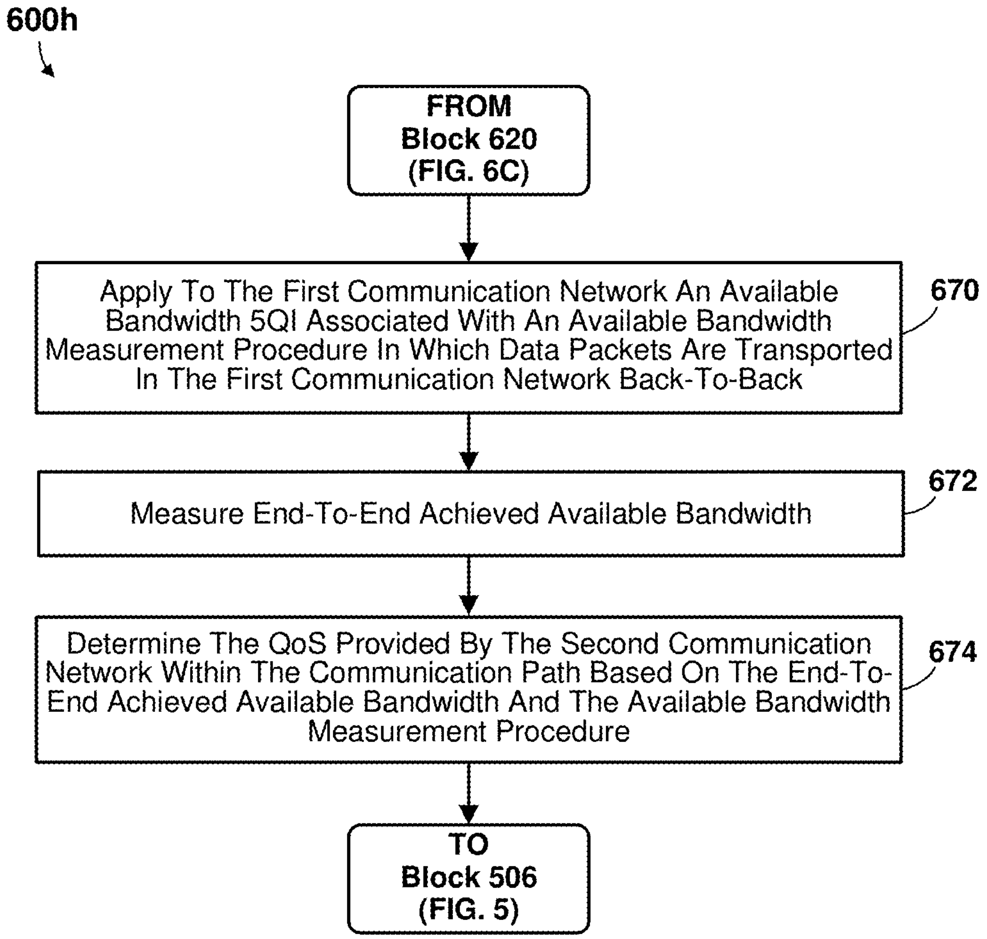

Referring to FIG. 6H, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may apply to the first communication network an available bandwidth 5QI associated with an available bandwidth measurement procedure in which data packets are transported in the first communication network back-to-back in block 670.

In some embodiments, in response to the available bandwidth 5QI, one or more network elements of the first communication network may be configured to process and/or transport packets back-to-back in a manner that introduces substantially negligible packet dispersion between or among transported packets. For example, the available bandwidth 5QI may be associated with a packet dispersion technique such that network elements of the first communication network are configured to transport packets in a manner that does not introduce or increase a time gap between or among transported packets. In some embodiments, network elements of the first communication network may be configured to achieve a substantially negligible time gap between packets using General Packet Radio Service (GPRS) Tunneling Protocol in the user plane (GTP-U) to encapsulate packets (e.g., measurement packets) and transport them via a GTP-U packet in the GTP-U tunnel in the first communication network. In some embodiments, the transported packets may arrive back-to-back at a UPF (e.g., 152*d*, 162, 172*d*, 182*d*) for routing to the second communication network. Means for performing the operations of block 670 may include the processor 210, 212, 214, 216, 218, 252, 260, 428 of a computing device functioning as a network element, the wireless transceiver 266, the transceiver 427, and the QoS configuration module 414.

In block 672, the processor may measure an end-to-end achieved available bandwidth. Means for performing the operations of block 672 may include the processor 210, 212, 214, 216, 218, 252, 260, 428 of a computing device functioning as a network element, the wireless transceiver 266, the transceiver 427, and the network measurement module 412.

In block 674, the processor may determine the QoS provided by the second communication network within the communication path based on the end-to-end achieved available bandwidth and the available bandwidth measurement procedure. In some embodiments, while the network element(s) of the first communication network are configured to transport packets back-to-back in a manner that introduces substantially negligible packet dispersion between or among transported packets, the processor may measure a time gap between packets arriving at an endpoint device (e.g., 158, 168, 176, 188). In such embodiments, the processor may determine the time gap between packets arriving at the endpoint device (e.g., in the second communication network) to be indicative of the bandwidth provided by the second communication network.

For example, referring to FIG. 6L, a 5G network may include a UE 694*a*, a gNB 694*b*, and a UPF 694*c*. The UE 694*a* (which may include or be proximate to an application client) may send two packets [1] and [2] (e.g., measurement packets) to the gNB 694*b* (e.g., 152*b*, 162*b*, 172*b*, 182*b*). The gNB 694*b* may encapsulate the packets [1] and [2] in a GTP-U packet, and may send the GTP-U packet to the UPF 694*c* via a GTP-U tunnel (which may be identified by a Tunnel Endpoint Identifier (TEID). The packets [1] and [2] may arrive back-to-back at the UPF 694*c*, and the UPF 694*c* may send the packets [1] and [2] to an application server 694*d* in a non-5G network. A time gap between the packets [1] and [2] may be measured at the application server 694*d*. The time gap measured by this packet dispersion technique may reflect an available bandwidth of the non-5G network.

In such embodiments, the network element may determine the available bandwidth measured via the packet dispersion technique to be the available bandwidth the second communication network. In some embodiments, in a case where the communication path spans two or more second communication networks (e.g., as in the communication systems 170 and 180), the network element may perform measurements using, e.g., a packet dispersion technique, for each second communication network, and the network element may determine the minimum of the available bandwidths to be the available bandwidth of all of the second communications. Means for performing the operations of block 674 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

Figure 6I:
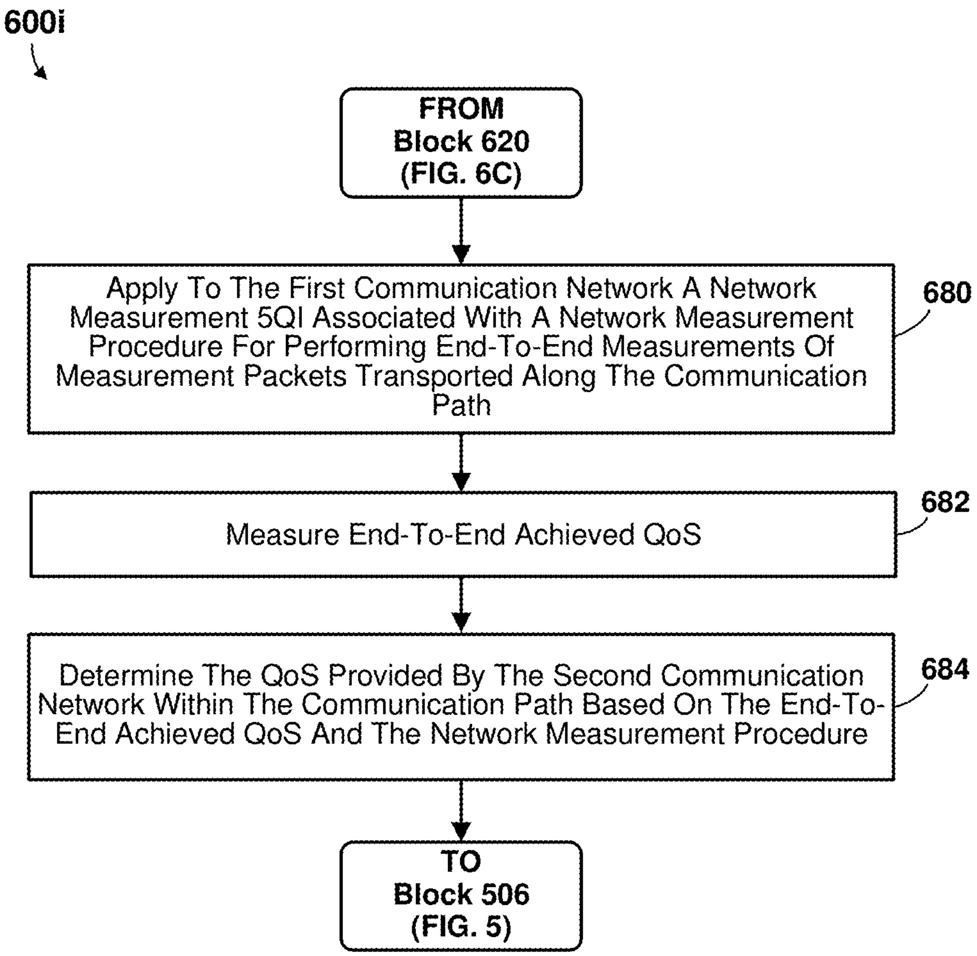
Figure 6J:
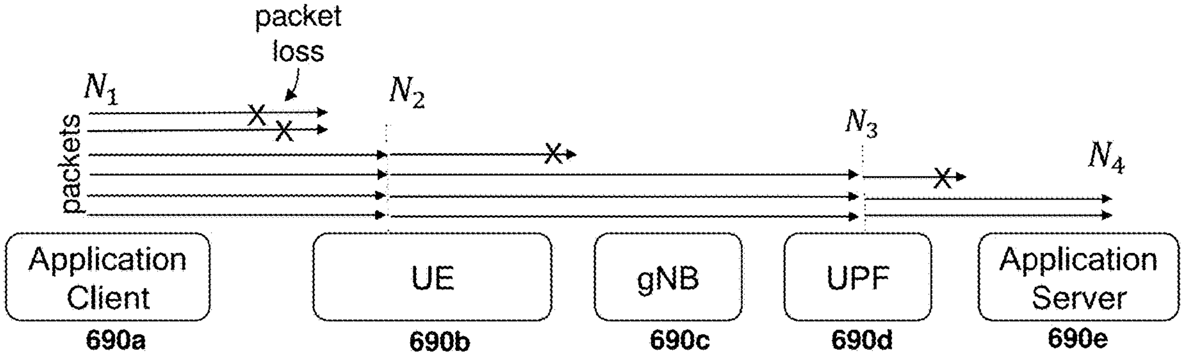
FIGS. 6J and 6K are conceptual diagrams illustrating example packet loss measurements.
Figure 6K:
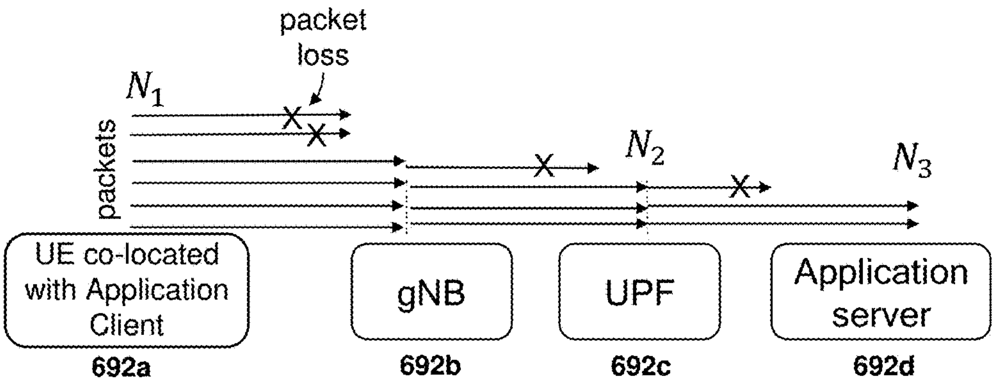
Figure 6L:
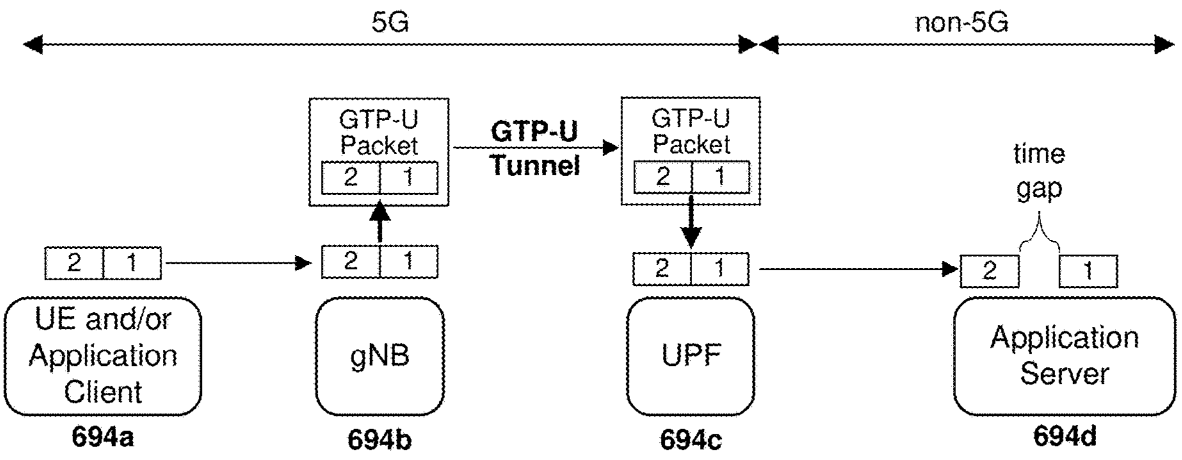
FIG. 6L is a conceptual diagram illustrating an example available bandwidth measurement.

Referring to FIG. 6I, after determining an end-to-end QoS requirement for communicating packets from a packet source to a packet destination via the communication path in block 502 of the method 500 as described, or determining a QoS provided by the second communication network within the communication path in block 504 of the method 500 as described, the processor may apply to the first communication network a network measurement 5QI associated with a network measurement procedure for performing end-to-end measurements of measurement packets transported along the communication path in block 680. In some embodiments, a network measurement 5QI may be configured and associated with operations that measure dedicated measurement packets (i.e., packets sent for measurement purposes that do not convey other signaling or data). In some embodiments, in response to the packet delay measurement 5QI, one or more network elements of the first communication network may be configured to transport the network measurement packets in a QoS flow exclusively for network measurement purposes. Means for performing the operations of block 680 may include the processor 210, 212, 214, 216, 218, 252, 260, 428 of a computing device functioning as a network element, the wireless transceiver 266, the transceiver 427, and the QoS configuration module 414.

In block 682, the processor may measure an end-to-end achieved QoS. Means for performing the operations of block 682 may include the processor 210, 212, 214, 216, 218, 252, 260, 428 of a computing device functioning as a network element, the wireless transceiver 266, the transceiver 427, and the network measurement module 412.

In block 684, the processor may determine the QoS provided by the second communication network within the communication path based on the end-to-end achieved QoS and the network measurement procedure. In some embodiments the network elements may function as a measurement entity to perform end-to-end measurements of the measurement packets, to determine the QoS provided by the second communication network. Means for performing the operations of block 684 may include the processor 210, 212, 214, 216, 218, 252, 260, 428 of a computing device functioning as a network element, the wireless transceiver 266, the transceiver 427, and the network measurement module 412.

The processor may then configure the first communication network to provide sufficient QoS to support the end-to-end QoS requirement based on the QoS provided by the second communication network in block 506 of the method 500 as described.

In various embodiments, a measurement entity may be configured to measure packet delay or message delay incurred by or caused by one or more non-5G networks (a "non-5G delay"). In various embodiments, the measurement entity may be configured to coordinate measurement procedures executed on the various entities involved. In various embodiments, the measurement entity may be executed by a processor in a UE, the processor in a network element in the 5G network, a processor executing and application client, or a processor executing in an application server.

In some embodiments, the measurement entity may be configured to determine a message delay or packet delay based on measurement messages that include timestamps sent between two endpoint devices (e.g., a packet source and a packet destination) along a multi-network communication path. In some embodiments, the measurement messages may include a timestamp request in a time stamp reply. In some embodiments, the measurement messages may include Real Time Protocol (RTP) or Real Time Control Protocol (RTCP) messages. In some embodiments, the endpoint devices may include smart glasses and an application server that communicate via the communication path. In some embodiments, the endpoint devices may include two UEs communicating via the communication path.

Figure 7A:
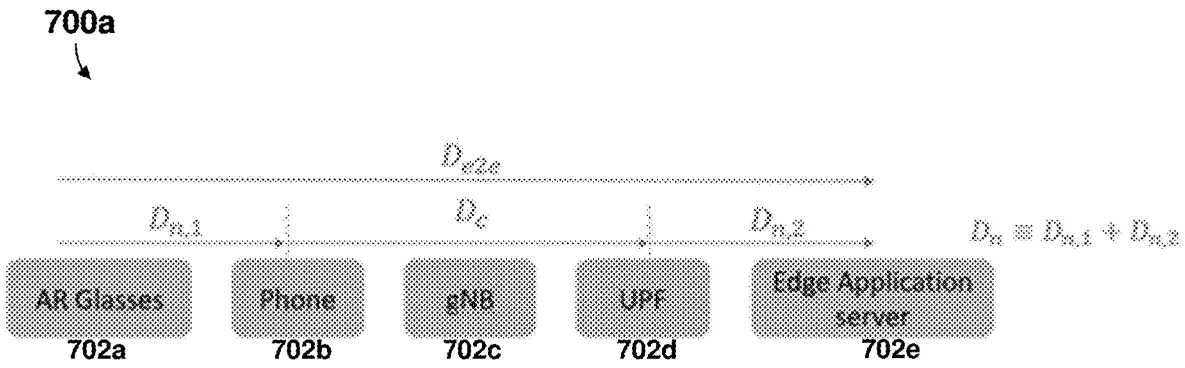
FIG. 7A illustrates communication devices and delay elements in an end-to-end communication path.

FIG. 7A illustrates component elements and delay elements in an end-to-end communication path 700*a* according to various embodiments. A key challenge for a 5G relay architecture involves properly estimating QoS allocation(s) that may be required to support services such as augmented reality (AR) sessions, mixed reality (MR) sessions, and the like that may be performed by UEs such AR glasses 702*a* (e.g., 174, 184). The QoS allocation(s) may take into account a wireless communication link (e.g., a "tethering" link) from the AR glasses 702*a* to a phone device 702*b* or another device that also communicates with a 5G network (a "5G device"). Aspects of this wireless communication link affect many QoS parameters, including bitrate, packet loss, delay, and jitter.

Referring to FIG. 7A, components of an end-to-end delay communication ("$D_{e2e}$") may include a tethering link delay ("$D_{n,1}$"), a delay over an intermediate communication network ("$D_c$"), and a delay caused by a communication link ("$D_{n,2}$") between the UPF 702*d* and Edge application server 702*e*. In some embodiments, $D_n \equiv D_{n,1}+D_{n,2}$. In some aspect, the Edge application server 702*e* may be replaced by an end device, for example, a pair of AR glasses that is different from the AR glasses 702*a*.

The phone 702*b* may estimate the effect of the tethering link $D_{n,1}$ on overall QoS requirement(s) to enable devices to perform operations for smooth performance of an AR/MR session. Also, the phone 702*b* (via a Media Access Function) and/or a network element such as UPF 790*a* may determine a delay caused by the communication link $D_{n,2}$ between the UPF 702*d* and Edge application server 702*e* (e.g., an Internet communication link).

In some embodiments, the phone 702*b* and/or the UPF 702*d* may estimate the delay $D_{n,2}$ by performing measurement tests for latency, packet loss, and bit rate, or by exchanging information with a radio access network (RAN) (e.g., gNB 702*c*) or AF managing a QoS policy. A consideration that needs to be addressed in measurement tests for latency is that some types of packets transmitted according to different protocols may transit the communication path with different delays. Because the purposes of measuring the communication link delay $D_{n,2}$ is to enable an element of the 5G core network (e.g., the UPF 702*d*) may adjust its QoS allocation for the 5G network to support delivery of data packets within the latency requirements of an application executing on a UE, the measurement test methods should ensure that delays of data packets consistent with the application traffic are measured and avoid measuring delays of packet types that are different from that of application data packets.

FIGS. 7B-7E are signal diagrams illustrating alternative message packet formats 700*b*, 700*c*, 700*d*, and 700*e* for measuring data packet delays in an end-to-end communication path according to various embodiments. An end-to-end communication path may include a communication path between a first computing device 704 and a second computing device 706. The communication path may traverse a communication network 708, which may include the communication path between the first computing device 704 and the second computing device 706, including a first communication network that is a 5G network (or other cellular network) and a second communication network that is not a 5G network (e.g., Wi-Fi, Bluetooth®, etc.).

In some embodiments, a computing device may be configured to determine (measure, calculate, obtain) an end-to-end delay incurred by one or more data packets traversing the communication path (a "data packet delay"). In some embodiments, a computing device (e.g., 704) may be configured to send to and/or receive from another computing device (e.g., 706) measurement packets. However, using typical measurement packets may yield an inaccurate measurement of data packet delay, owing to differences in how measurement packets and data packets are handled by communication networks and differences in packet size.

Delay measurement methods should accommodate the fact that a communication network may apply a different QoS to measurement packets than to data packets (e.g., packets including image, audio, video, multimedia data, pose data, and other application data). Differences in delay measurements may occur because conventional measurement packets may be handled using different protocols than data packets. For example, in cellular communication networks (e.g., 5G networks), measurement packets (e.g., Echo and Echo Reply messages) may be handled using Internet Control Message Protocol (ICMP), which may include protocol number 1 in the data packet header, while data packets may be handled using Real Time Protocol (RTP) or User Datagram Protocol (UDP), which may include protocol number 17 in the packet header. Measurement packets and data packets may have different IP 5-tuples, with different IP source addresses, IP destination addresses, source port numbers, destination port numbers, and/or protocol numbers. Measurement packets and data packets may be mapped to different QoS flows, and as a result receive different QoS treatment in communication networks such as 5G networks. With respect to non-cellular communication networks (e.g., non-5G networks), measurement packets and data packets may be configured with different Differentiated Services Code Point (DSCP) values in an IP packet header, and may be mapped to different access categories in a Wi-Fi network. Further, data packets typically are substantially larger than measurement packets (include a substantially greater number of bits), and because of such size differences, delay measurements using measurement packets may not be representative of actual data delay incurred by data packets, especially for low bit rate communication links.

Various embodiments include mechanisms to improve the accuracy of data delay measurements. Computing devices configured to perform the methods 700*b*-700*e* may determine a data packet delay between the first computing device and a second computing device, and may use the determined packet delay to set, or may provide the determined delay packet for use in setting, a quality of service for a communication path between the first computing device and the second computing device.

Figure 7B:
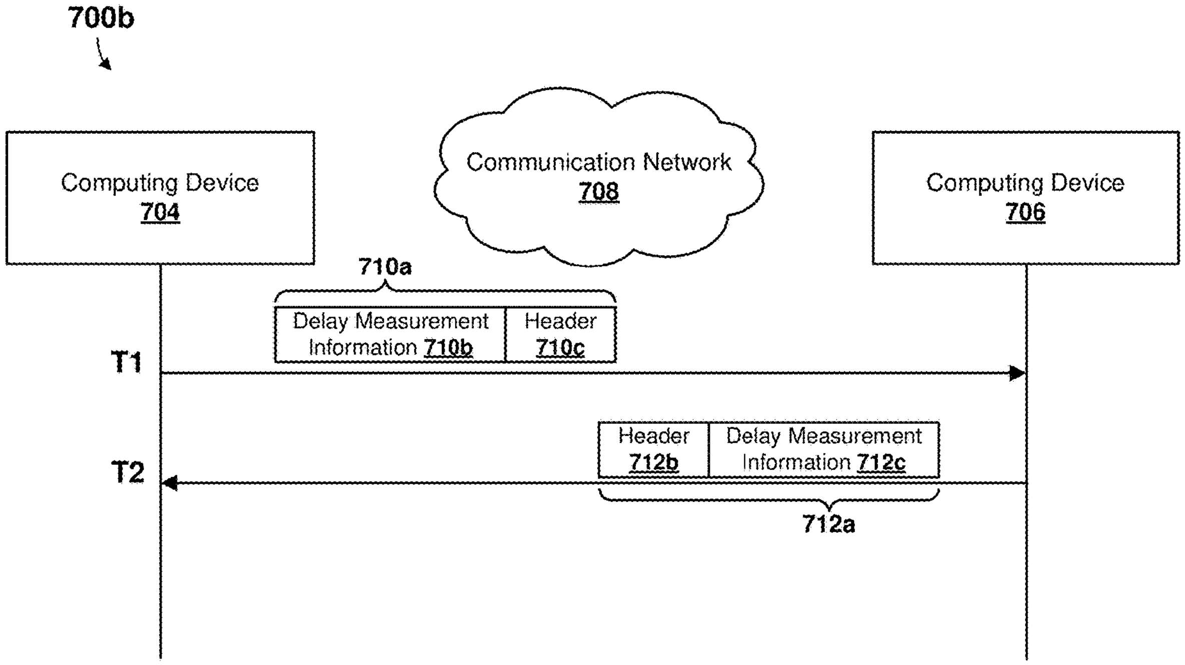
FIGS. 7B-7E are signal diagrams illustrating alternative message packet formats for measuring data packet delays in an end-to-end communication path according to various embodiments.

Referring to the message diagram 700*b* illustrated in FIG. 7B, a first computing device 704 may transmit to a second computing device 706 a first packet 710*a* at a time T1. The first packet 710*a* may include a header portion 710*c* and a payload portion that includes delay measurement information 710*b*. The header portion 710*c* may be configured to indicate that the first packet 710*a* is a data packet. The header portion 710*c* also may be configured to indicate a payload type for the payload portion. The payload type may indicate that the payload portion includes the delay measurement information 710*b*. For example, the first packet 710*a* may be a packet configured according to a protocol such as RTP or Secure (SRTP). The header portion 710*c* may indicate a delay measurement payload type according to RTP or SRTP. In some embodiments, the first packet 710*a* may be configured with one or more filler bits such that a size of the first packet 710*a* is substantially the same size as a data packet. In some embodiments, the delay measurement information 710*b* may include an Echo message according to the ICMP protocol. In some embodiments, the delay measurement information 710*b* may include a sequence number, a time stamp message, a timestamp, and/or a collection of timestamps.

The second computing device 706 may transmit to the first computing device 704 a second packet 712*a*. The second packet 712*a* may include a header portion 712*b* and a payload portion that includes a delay measurement message 712*c*. The first computing device 704 may receive the second packet 712*a* at a time T2. The header portion 712*b* may be configured to indicate that the second packet 712*a* is a data packet. The header portion 712*b* also may be configured to indicate that a payload type of the payload portion is or includes delay measurement information 712*c*. In some embodiments, the second packet 712*a* may be a packet configured according to a protocol such as RTP or SRTP, and the header portion 712*b* may indicate a delay measurement payload type according to RTP or SRTP. In some embodiments, the delay measurement message 712*a* may include an Echo Reply message according to the ICMP protocol. In some embodiments, the delay measurement message 712*c* may include a sequence number, a time stamp message, a timestamp, and/or a collection of timestamps. In some embodiments, the second packet 712*a* may be configured with one or more filler bits such that a size of second packet 712*a* is substantially the same size as a data packet. In some embodiments, the first computing device 704 may determine a data packet round trip time (RTT) as T2–T1. In some embodiments, the delay measurement information 710*b* and/or 712*c* may not include a synchronization source (SSRC) field and/or other Real-time Transport Protocol (RTP) Control Protocol (RCTP) fields. This may reduce the size of the first packet 710*a* and/or the second packet 712*a* so that the first packet 710*a* and/or the second packet 712*a* incur lower processing and/or transport overhead.

Figure 7C:
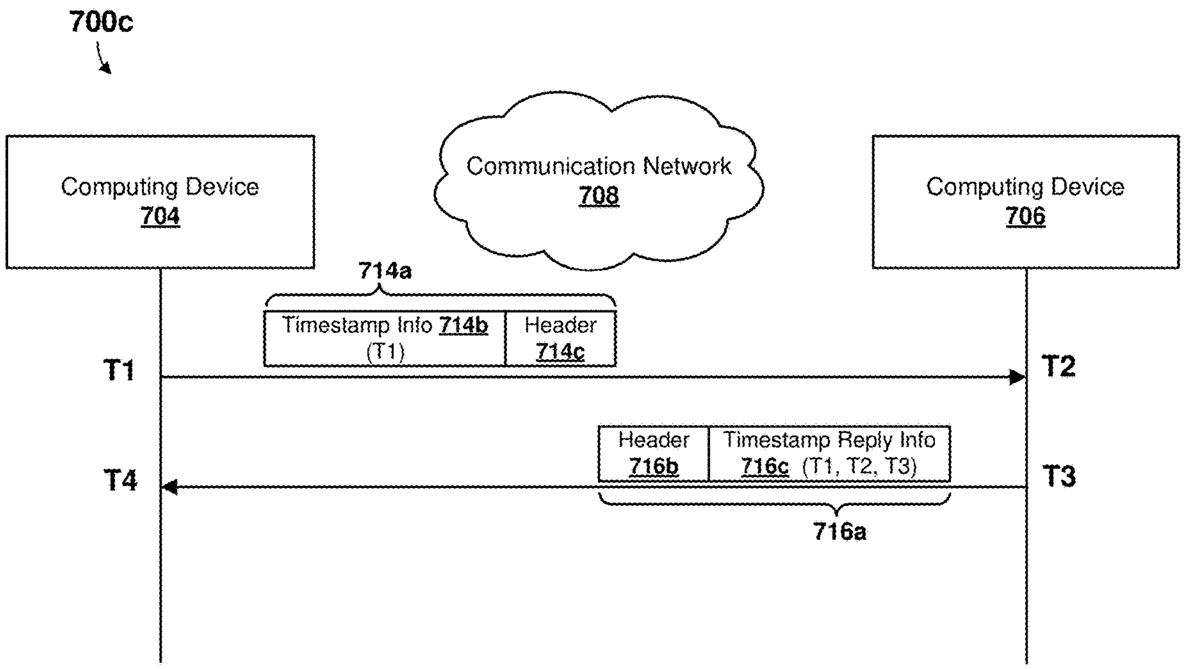

Referring to the message diagram 700*c* illustrated in FIG. 7C, the first computing device 704 may transmit to the second computing device 706 a first packet 714*a* at a time T1. The first packet 714*a* may include a header portion 714*c* and a payload portion that includes timestamp information 714*b*. In some embodiments, the timestamp information 714*b* may include a timestamp message. In some embodiments, the timestamp message may be an ICMP Timestamp message. In some embodiments, the timestamp message may be a Network Time Protocol (NTP) timestamp message. In some embodiments, the timestamp message may be a Precision Time Protocol (PTP) timestamp message. In some embodiments, the timestamp information 714*b* may include an indication of the time T1 (which may be a timestamp). The second computing device 706 may receive the first packet 714*a* at a time T2. In some embodiments, the first packet 714*a* may be configured with one or more filler bits such that a size of the first packet 714*a* is substantially the same size as a data packet.

The second computing device 706 may transmit a second packet 716*a* at a time T3. The second packet 716*a* may include a header portion 716*b* in a payload portion that includes timestamp reply information 716*c*. In some embodiments, the timestamp reply information 716*c* may include a timestamp reply message. In some embodiments, the timestamp reply information 716*c* may include an indication of the times T1, T2, and T3. The first computing device 704 may receive the second packet 716*a* at a time T4. In some embodiments, the second packet 716*a* may be configured with one or more filler bits such that a size of second packet 716*a* is substantially the same size as a data packet.

In some embodiments, the header 710*c* may carry a synchronization source (SSRC) that is different from the SSRC of an RTP packet that carries the media, and this difference indicates to the second computing device 706 that the payload of the RTP packet is delay measurement information 710*b*. This RTP packet 710*a* may include the same IP 5-tuple as an RTP packet that carries the media, and the two packets may receive the same QoS treatment in a communication network. In some embodiments, the header 712*b* may carry (include) information in a synchronization source (SSRC) field that is different from the SSRC of an RTP packet that carries media information (media data). This difference (the information in the SSRC field) may indicate to the first computing device 704 that the payload of the RTP packet includes delay measurement information 712*c*. In some embodiments, the use of information in the SSRC field to indicate that the payload includes delay measurement information (e.g., rather than media data) is applicable to SRTP.

In some embodiments, the first computing device 704 may determine a data packet round trip time (RTT) as T4−T3+T2−T1. In some embodiments, the first computing device may determine a one-way data delay as (T4−T3+T2−T1)/2. In some embodiments, the first computing device 704 and the second computing device 706 may be time synchronized. In such embodiments, the first computing device 704 may determine a one-way data delay from the first computing device 704 to the second computing device 706 as T2−T1. In some embodiments, the first computing device 704 may determine a one-way data delay from the second computing device 706 to the first computing device 704 as T4−T3.

Figure 7D:
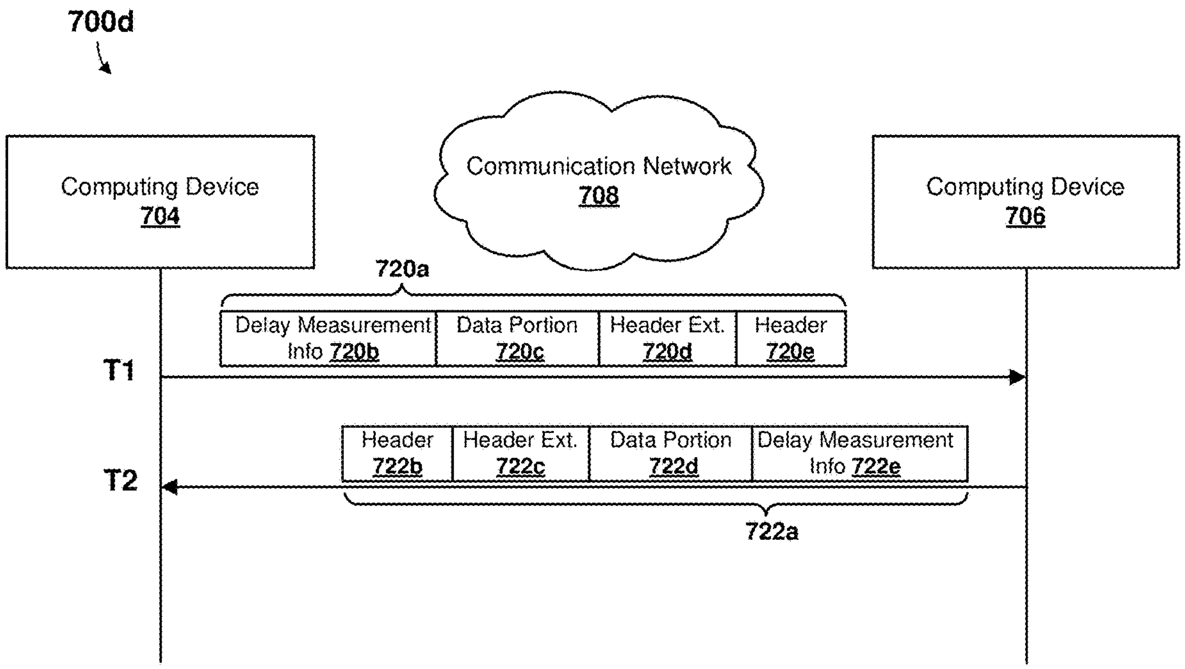
Figure 7E:
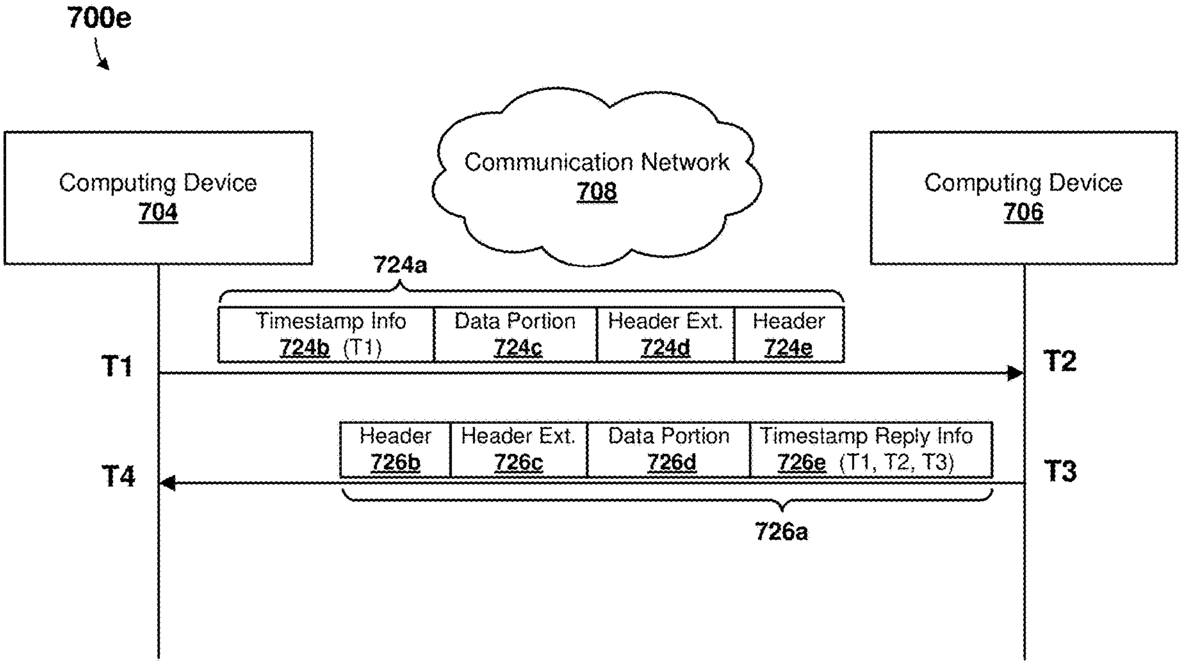

Referring to the message diagrams 700*d* and 700*e* illustrated in FIGS. 7D and 7E, a delay measurement message and data (e.g., data content such as images, audio, video, multimedia data, pose, and/or the like) may be included in a data packet. In some embodiments, a data packet including only a delay measurement message in a payload portion of the packet (such as may be performed in the message diagrams 700*b* and 700*c*, as described) may be handled differently by a true data packet (i.e., a packet with a header portion indicating that the payload includes data, and data in the payload portion). For example, a data packet including only a delay measurement message may be handled by a communication network differently from a data packet including data in the payload portion, according to or through the application of one or more of a different 5QI, DSCP, access category, or other QoS handling, particularly if the communication network QoS provisioning uses or is based on the payload type of the packet.

Referring to the message diagram 700*d* illustrated in FIG. 7D, the first computing device 704 may transmit to the second computing device 706 first packet 720*a* at a time T1. The first packet 720*a* may include a header portion 720*e*, a header extension portion 720*d*, and a payload portion that includes a data portion 720*c* and delay measurement information 720*b*. The header portion 720*e* may be configured to indicate that the first packet 720*a* is a data packet. The header portion 720*e* also may be configured to indicate a payload type for the payload portion. The payload type may indicate that the payload portion includes the data portion 720*c*. For example, the first packet 720*a* may be a packet configured according to a protocol such as RTP or Secure (SRTP). The header portion 720*e* may indicate a data payload type according to RTP or SRTP. The header extension portion 720*d* may include instructions or information that may enable the second computing device 706 to extract the delay measurement information 720*b* from the first packet 720*a*. In some embodiments, the header extension portion 720*d* may include the length of the data portion 720*c*. In some embodiments, the header extension portion 720*d* may include starting bit position of the delay measurement information 720*b*. In some embodiments, the data portion 720*c* may be behind the delay measurement information 720*b* and this may allow the receiver to read the delay measurement information 720*b* sooner. In some embodiments, the delay measurement information 720*b* may include an Echo message according to the ICMP protocol. In some embodiments, the delay measurement information 720*b* may include a sequence number, a time stamp message, a timestamp, and/or a collection of timestamps.

The second computing device 706 may transmit to the first computing device 704 a second packet 722*a*. The second packet 722*a* may include a header portion 722*b*, a header extension portion 722*c*, and a payload portion that includes a data portion 722*d* and delay measurement information 722*e*. The first computing device 704 may receive the second packet 722*a* at a time T2.

The header portion 722*b* may be configured to indicate that the second packet 722*a* is a data packet. The header portion 722*b* also may be configured to indicate that the second packet 722*a* is a data packet. The header portion 722*b* also may be configured to indicate a payload type for the payload portion. The payload type may indicate that the payload portion includes the data portion 722*d*. For example, the second packet 722*a* may be a packet configured according to a protocol such as RTP or Secure (SRTP). The header portion 722*b* may indicate a data payload type according to RTP or SRTP. The header extension portion 722*c* may include instructions or information that may enable the first computing device 704 to extract the delay measurement information 722*e* from the first packet 720*a*. In some embodiments, the data portion 722*d* may be behind the delay measurement information 722*e*. In some embodiments, the delay measurement information 722*e* may include an Echo Reply message according to the ICMP protocol. In some embodiments, the delay measurement information 722*e* may include a sequence number, a time stamp message, a timestamp, and/or a collection of timestamps. In some embodiments, the first computing device 704 may determine a data packet round trip time (RTT) as T2−T1.

Referring to the message diagram 700*e* illustrated in FIG. 7E, the computing device 704 may transmit to the second computing device 706 first packet 724*a* at a time T1. The first packet 724*a* may include a header portion 724*e*, a header extension portion 724*d*, and a payload portion that includes a data portion 724*c* and timestamp information 724*b*. The header portion 720*e* may be configured to indicate that the first packet 724*a* is a data packet. The header portion 724*e* also may be configured to indicate a payload type for the payload portion. The payload type may indicate that the payload portion includes the data portion 724*c*. For example, the first packet 724*a* may be a packet configured according to a protocol such as RTP or SRTP. The header portion 724*e* may indicate a data payload type according to RTP or SRTP. The header extension portion 724*d* may include instructions or information that may enable the second computing device 706 to extract the timestamp information 724*b* from the first packet 724*a*. In some embodiments, the header extension portion 724*d* may include the length of the data portion 724*c*. In some embodiments, the header extension portion 724*d* may include starting bit position of the delay measurement information 724*b*. In some embodiments, the data portion 724*c* may be behind the delay measurement information 724*b*. In some embodiments, the timestamp information 724*b* may include an indication of the time T1. In some embodiments, the second computing device 706 may receive the first packet 724*a* at a time T2.

The second computing device 706 may transmit a second packet 726*a* at a time T3. The second packet 716*a* may include a header portion 726*b*, a header extension portion 726*c*, and a payload portion that includes a data portion 726*d* and timestamp reply information 726*e*. In some embodiments, the timestamp reply information 726*e* may include an indication of the times T1, T2, and T3. The header portion 726*b* may be configured to indicate that the first packet 726*a* is a data packet. The header portion 726*b* also may be configured to indicate a payload type for the payload portion, for example, indicating that the payload portion includes the data portion 726*d*. For example, the first packet 726*a* may be a packet configured according to a protocol such as RTP or SRTP. The header portion 726*b* may indicate a data payload type according to RTP or SRTP. The header extension portion 726*c* may include instructions or information that may enable the first computing device 704 to extract the timestamp reply information 726*e* from the second packet 726*a*. In some embodiments, the data portion 726*d* may be behind the delay measurement information 726*e*. In some embodiments, the first computing device 704 receive the second packet 726*a* at a time T4.

In some embodiments, e.g., the message diagram 700*d* (FIG. 7D), delay measurement information may be included in a RTP header extension or an SRTP header extension, rather than in the payload of the RTP packet or the SRTP packet. In some embodiments, e.g., the message diagram 700*e* (FIG. 7E), timestamp information and/or the timestamp reply information may be included in a RTP header extension or an SRTP header extension, rather than in the payload of the RTP packet or the SRTP packet.

In some embodiments, the first computing device 704 may determine a data packet round trip time (RTT) as T4−T3+T2−T1. In some embodiments, the first computing device may determine a one-way data delay as (T4−T3+T2−T1)/2. In some embodiments, the first computing device 704 and the second computing device 706 may be time synchronized. In such embodiments, the first computing device 704 may determine a one-way data delay from the first computing device 704 to the second computing device 706 as T2−T1. In some embodiments, the first computing device 704 may determine a one-way data delay from the second computing device 706 to the first computing device 704 as T4−T3.

Figure 7F:
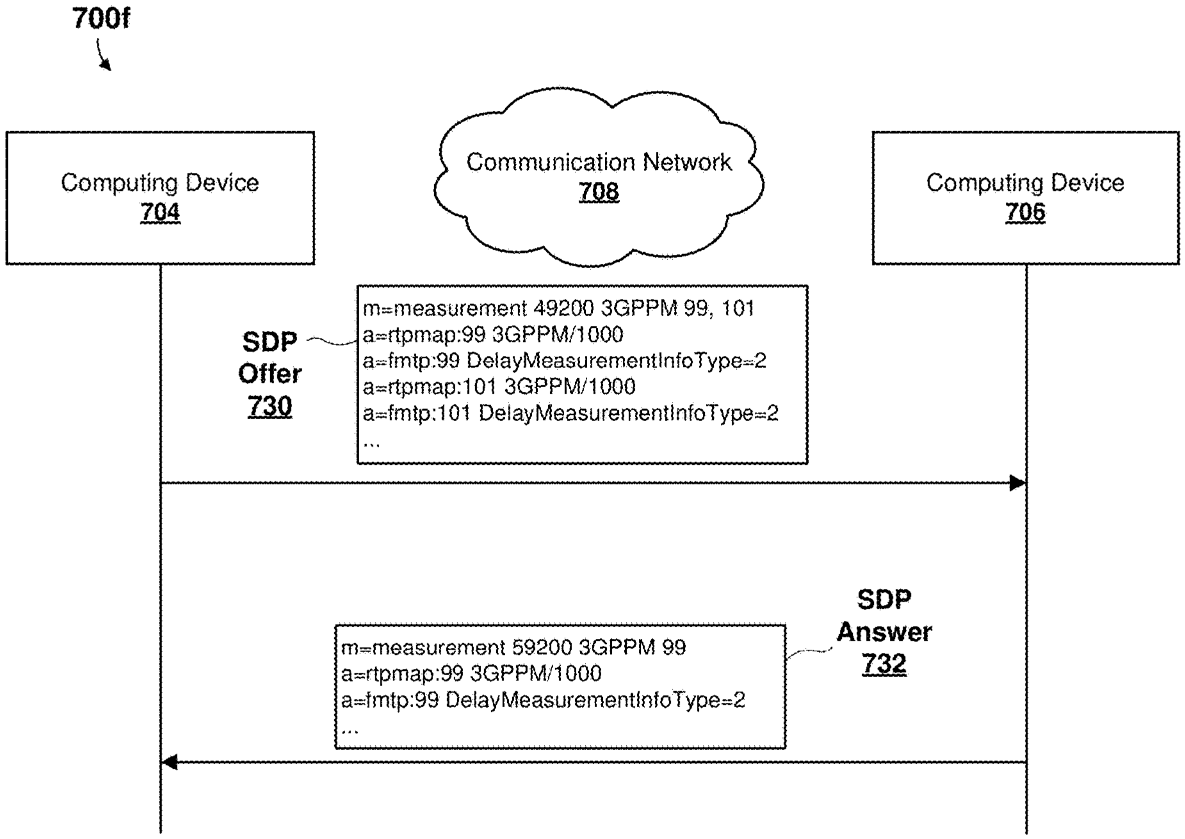
FIGS. 7F and 7G are signal diagrams illustrating operations that may be performed by computing devices to configure the computing devices to perform operations for measuring data packet delays in an end-to-end communication path according to various embodiments.
Figure 7G:
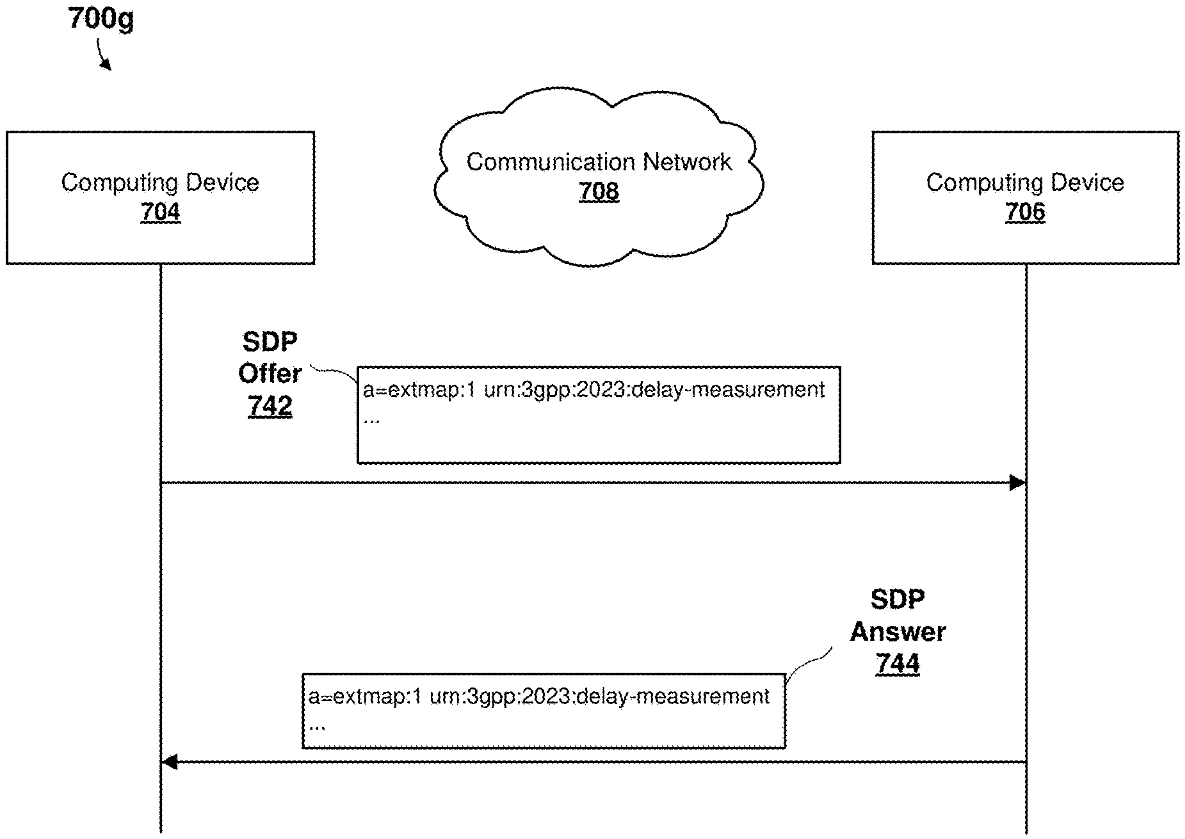

FIGS. 7F and 7G are signal diagrams illustrating operations 700*f* and 700*g* that may be performed by the computing devices 704 and 706 to configure the computing devices 704 and 706 to perform operations for measuring data packet delays in an end-to-end communication path according to various embodiments. An end-to-end communication path may include a communication path between a first computing device 704 and a second computing device 706. The communication path may traverse a communication network 708, which may include the communication path between the first computing device 704 and the second computing device 706, including a first communication network that is a 5G network (or other cellular network) and a second communication network that is not a 5G network (e.g., Wi-Fi, Bluetooth®, etc.). The operations 700*f* and 700*g* are described in terms of RTP for clarity, but this is not a limitation on the applicability of such operations.

In various embodiments, the first computing device 704 and the second computing device 706 may send and receive information including capability or configuration information that may enable the first computing device 704 and the second computing device 706 to set up for performing, transmitting, and/or receiving in-band delay measurements. Such configuration information may enable the first computing device 704 and the second computing device 706 to perform operations, such as negotiation operations, and select a type of message(s) to be used, as well as a structure or content of such message(s).

With reference to FIG. 7F, in some embodiments, the operations 700*f* may be performed in embodiments in which measurement information are handled as a packet payload. In some embodiments, a first computing device 704 may transmit to a second computing device 706 a configuration offer (e.g., an SDP Offer) 730. The configuration offer 730 may include one or more options of configuration parameters or settings that the first computing device 704 and the second computing device 706 could use for transmitting or receiving in-band delay measurements.

For example, the configuration offer 730 may include information such as "m=measurement 49200 3GPPM 99" that indicates a media type "m," a port number on which a measurement will be performed, and/or a port number from which measurement information will be transmitted (e.g., 49200). For example, a measurement type may include a 3GPP measurement ("3GPPM").

The configuration offer 730 also may include indications of one or more payload types, (e.g., "99" and "101", or another suitable indication or a payload type), as well as information describing or defining the indicated payload types. For example, the configuration offer 730 may include information about payload type 99, such as "a=rtpmap:99 3GPPDM/1000" indicating a 3GPP delay measurement, and "a=fmtp:99 DelayMeasurementInfoType=2," in which "DelayMeasurementInfoType" identifies a delay measurement type. The delay measurement type may be, for example, an Echo message, an Echo Reply message, a time stamp message, a timestamp, or a collection of timestamps.

The second computing device 706 may receive the configuration offer 730, and may formulate and transmit to the first computing device 704 a configuration answer (e.g., an SDP Answer) 732. The configuration answer 732 may indicate a delay measurement method in the configuration offer 730 that the second computing device 706 supports (or selects). The configuration answer 732 may, for example, include information such as "m=measurement 59200 3GPPM 99" that indicates a media type "m", a port number on which a measurement will be performed, a port number from which measurement information will be transmitted (e.g., 59200), and/or a payload type (e.g., "99"). The configuration answer 732 also may include information describing or defining the indicated payload type(s), such as "a=rtpmap:99 3GPPDM/1000" indicating a 3GPP delay measurement, and "a=fmtp:99 DelayMeasurementInfoType=2," in which "DelayMeasurementInfoType" identifies a delay measurement type. The delay measurement type may be, for example, an Echo message, an Echo Reply message, a time stamp message, a timestamp, or a collection of timestamps.

The first computing device 704 and the second computing device 706 may use the selected or indicated configuration information for performing, transmitting, and/or receiving in-band delay measurements.

Referring to FIG. 7G, in some embodiments, the operations 700*g* may be performed in embodiments in which measurement information may be handled as a modification of a header extension (such as an RAN header extension). For example, the first computing device 704 may transmit a configuration offer (e.g., SDP Offer) 742 that includes information indicating a packet header extension associated with a universal resource name (URN). For example, the configuration offer 742 may include an extension map attribute "a=extmap:1 urn:3gpp:2023: delay-measurement", in which "extmap" indicates an extension map, "urn" indicates a URN, and "3gpp:2023: delay-measurement" indicates a 3GPP measurement of a delay measurement.

The second computing device 706 may receive the configuration offer 742 and may formulate and transmit a configuration answer (e.g., an SDP Answer) 744. In some embodiments, the configuration answer 744 may include the same information as the configuration offer 742, indicating acceptance of the proposed parameters, or the configuration answer 744 may include the different information as the configuration offer 742, indicating different proposed parameters for use by the computing device 704 and the computing device 706. The first computing device 704 and the second computing device 706 may use the selected or indicated configuration information for performing, transmitting, and/or receiving in-band delay measurements via modified header extension(s).

FIGS. 7H, 7I, 7J, and 7K are diagrams illustrating information structures 700*h*, 700*f* and 700*j* that may be used by the computing devices 704 and 706 to transmit or receive in-band delay measurement information according to various embodiments. For example, the computing devices 704 and 706 may use the information structures 700*h*, 700*f* and 700*j* in any of the methods and/or operations 700*a*-700*e*.

With reference to FIG. 7H, the information structure 700*h* may include fields with information such as a sequence number 750*a*, a timestamp 750*b*, one or more SSRC identifiers 750*c*, and one or more contributing source (CSRC) identifiers 750*d*. The information structure 700*h* may indicate a length 750*e* (which may be defined by a profile) and a header extension 750*f*. In some embodiments, the timestamp(s) may refer to Coordinated Universal Time (UTC) or Universal Time (UT) (i.e., milliseconds from midnight Greenwich Mean Time).

With reference to FIG. 7I, the first computing device (e.g., 704) may transmit the information structure 700*i* to the second computing device (e.g., 706). The information structure 700*i* may include fields with information such as the timestamp 752 (e.g., Network Time Protocol (NTP) timestamp T1) and other suitable information.

With reference to FIG. 7J, the second computing device (e.g., 706) may transmit the information structure 700*j* to the first computing device (e.g., 704). The information structure 700*j* may include fields with information such as a timestamp T1' 754, one or more delay measurements 754*b* and 754*c* (e.g., T2-T1, T3-T2, and the like), and other suitable information.

With reference to FIG. 7K, the information structure 700*k* may include fields with information such as a message type or information type 756*a*, a code 756*b*, checksum information 756*c*, an identifier 756*d*, a sequence number 756*e*, an originate timestamp 756*f*, a receive timestamp 756*g*, a transmit timestamp 756*h*, and other suitable information. The information structure 700*k* may be an ICMP Timestamp message (e.g., when receive timestamp 756*g* and/or a transmit timestamp 756*h* are absent) or Timestamp Reply message.

Figure 8A:
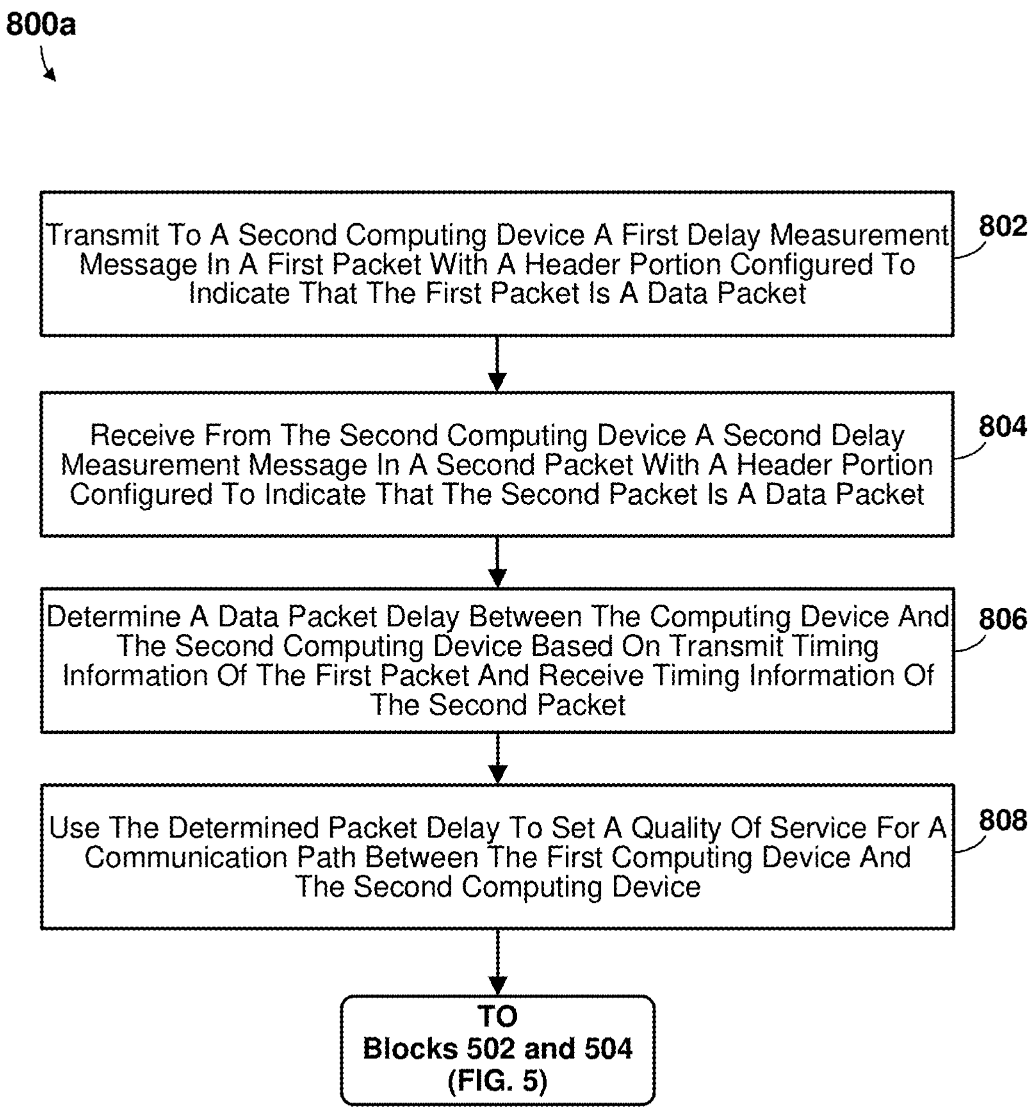
FIG. 8A is a process flow diagram illustrating a method that may be performed by a processor of a computing device for managing a data delay in an end-to-end communication path according to some embodiments.

FIG. 8A is a process flow diagram illustrating a method 800*a* that may be performed by a processor of a computing device for managing a data delay in an end-to-end communication path according to some embodiments. With reference to FIGS. 1-8A, the operations of the method 800*a* may be performed by a processor (such as the processor 210, 212, 214, 216, 218, 252, 260) of a computing device (e.g., a first computing device) configured to function as an endpoint computing device (e.g., 152*a*, 158, 162*a*, 168, 174, 172*a*, 176, 182*a*, 184, 188, 320, 702*a*, 702*e*, 704, 706), referred to as a "processor." In some embodiments, the computing device may include a processor, memory (e.g., 220, 258, 902, 908, 1016) coupled with the processor, and instructions stored in the memory and executable by the processor to cause the computing device to perform the operations of the method 800*a*.

In block 802, the processor may transmit to a second computing device a first delay measurement message in a first packet with a header portion configured to indicate that the first packet is a data packet. In some embodiments, a communication path between the first computing device and the second computing device may span a first communication network that is a 5G network and a second communication network that is not a 5G network.

In some embodiments, the processor may configure the first packet such that the header portion of the first packet indicates that a payload portion of the first packet may include the first delay measurement message. In some embodiments, the processor may configure the first packet to have substantially the same size as a data packet. In some embodiments, the processor may configure the first packet such that the first delay measurement message may include an Echo message. In some embodiments, the processor may configure the first packet such that a payload portion of the first packet may include the first delay measurement message and a data portion. In some embodiments, the processor may configure the first packet with a header extension configured to indicate to the second computing device how to extract the first delay measurement message from the first packet.

In block 804, the processor may receive from the second computing device a second delay measurement message in a second packet with a header portion configured to indicate that the second packet is a data packet. In some embodiments, the header portion of the second packet may indicate that a payload portion of the second packet may include the second delay measurement message. In some embodiments, second delay measurement message in the second packet may include an Echo Reply message. In some embodiments, a payload portion of the second packet may include the second delay measurement message and a data portion. In some embodiments, the second packet may include a header extension configured to indicate to the first computing device how to extract the second delay measurement message from the second packet.

In block 806, the processor may determine a data packet delay between the first computing device and the second computing device based on transmit timing information of the first packet and receive timing information of the second packet. In some embodiments, the transmit timing information of the first delay measurement message may include a first transmit time. In some embodiments, the receive timing information of the second delay measurement message may include the first transmit time, a first receive time by the second computing device, a second transmit time of the second delay measurement by the second computing device, and a second receive time of a second delay measurement by the first computing device. In some embodiments, the processor may determine the data packet delay based on the first transmit time and the first receive time, the second transmit time and the second receive time, or the first transmit time, the first receive time, the second transmit time, and the second receive time.

In block 808, the processor may use the determined packet delay to set a quality of service for a communication path between the first computing device and the second computing device.

Following the performance of the operations of block 808, a processor of a computing device functioning as a network endpoint may perform the operations of blocks 502 and 504 of the method 500 as described. Additionally, the operations in the method 800*a* and method 500 may be performed continuously, periodically, or episodically to enable the communication network to adjust the QoS of a portion of the communication path in response to changes in the application data latency requirements and link quality of various portions of the communication path.

Figure 8B:
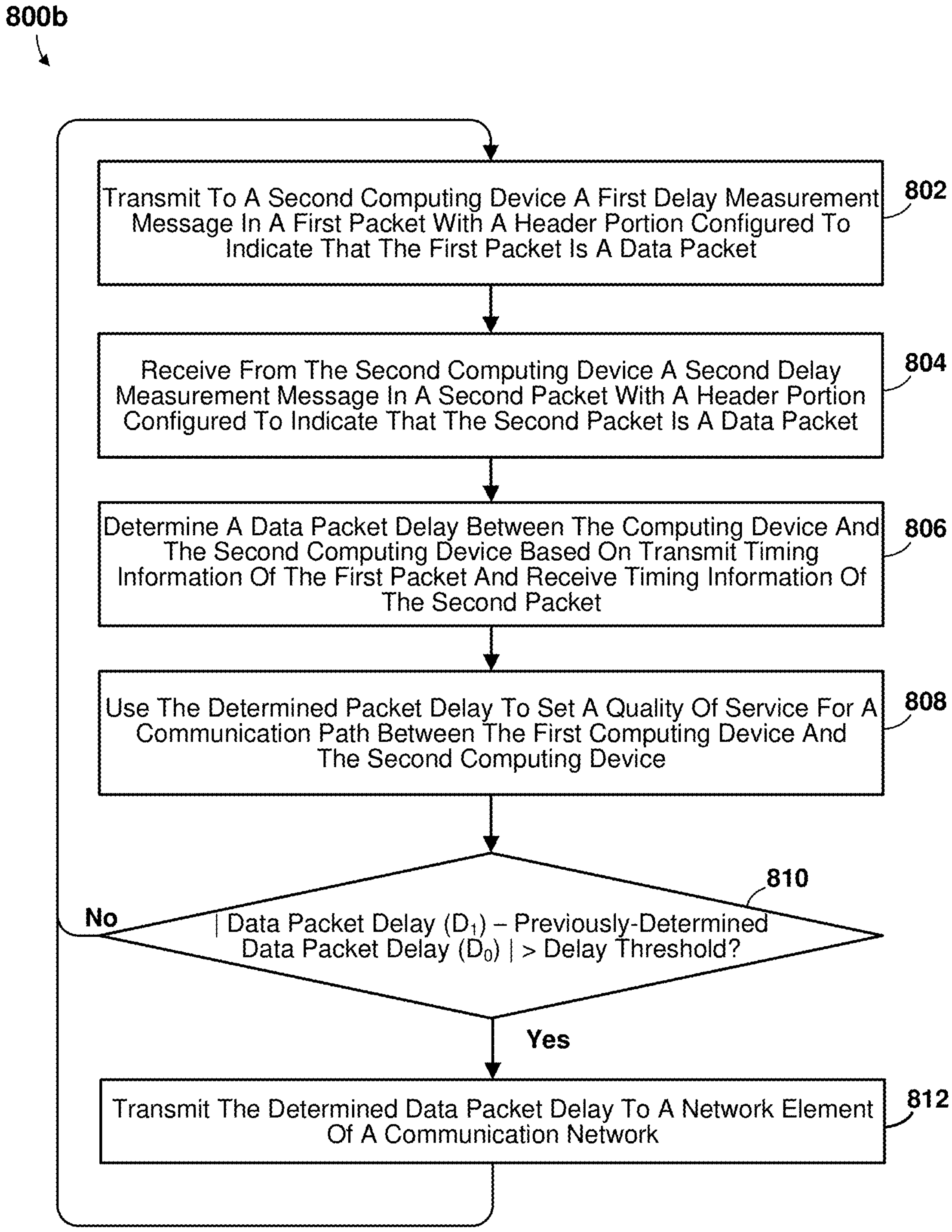
FIGS. 8B, 8C, and 8D are process flow diagrams illustrating operations that may be performed by a processor of a computing device as part of the method for managing a data delay in an end-to-end communication path according to some embodiments.
Figure 8C:
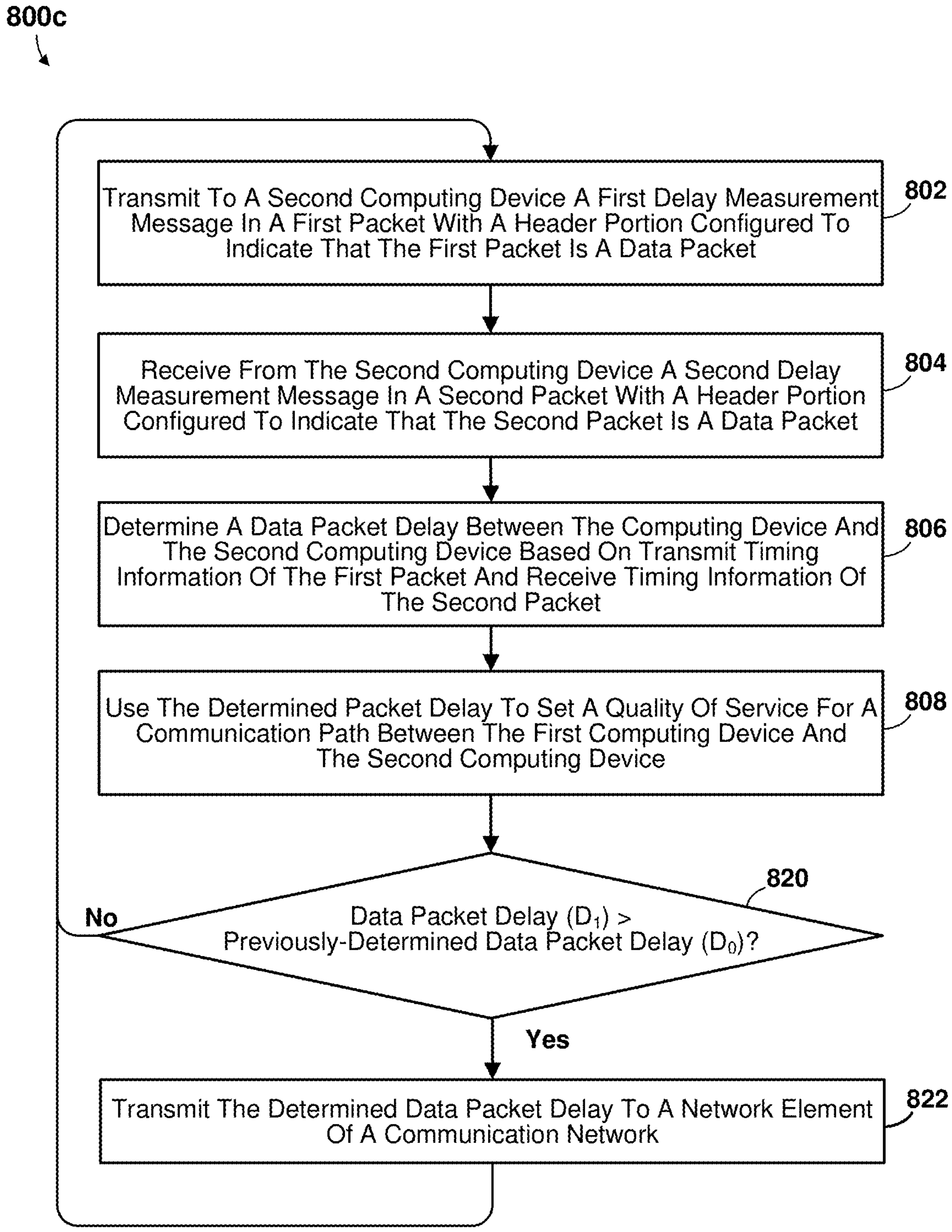
Figure 8D:
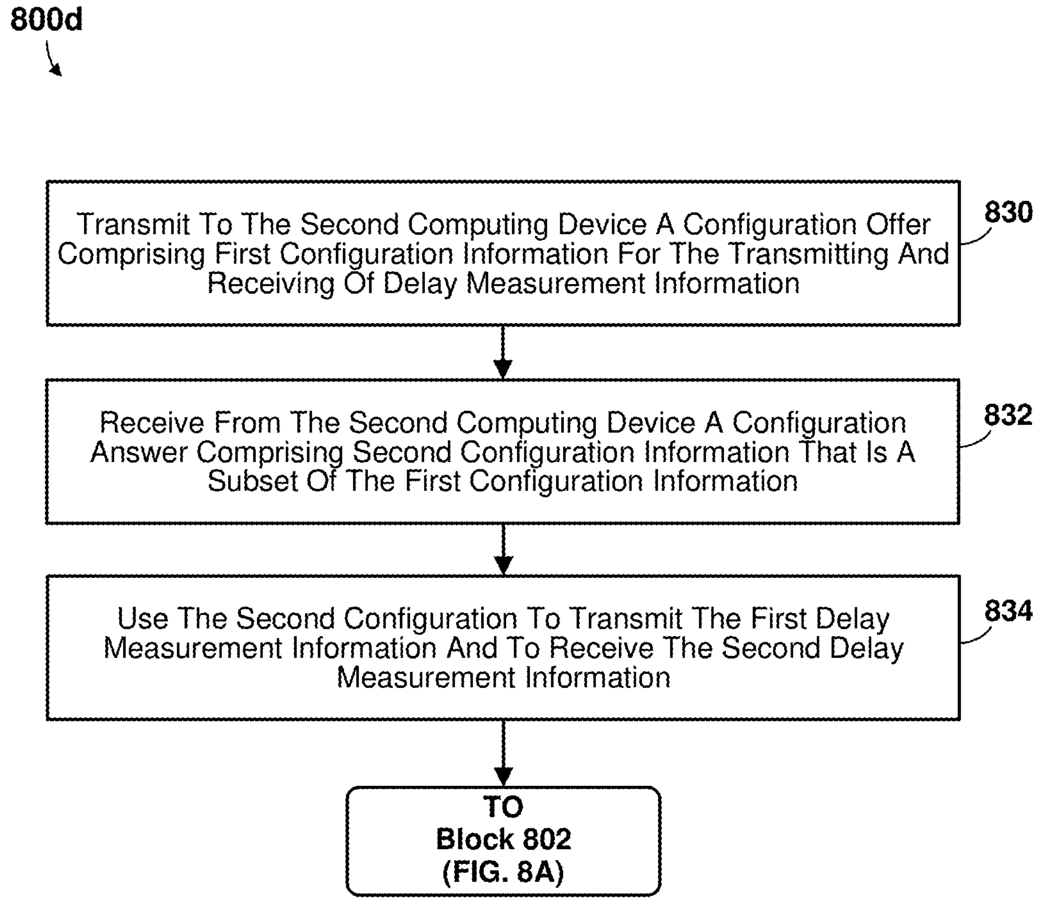

FIGS. 8B, 8C, and 8D are process flow diagrams illustrating operations 800*b*-800*d* that may be performed by a processor of a computing device as part of the method 800*a* for managing a data delay in an end-to-end communication path according to some embodiments. With reference to FIGS. 1-8D, the operations 800*b*-800*d* may be performed by a processor (such as the processor 210, 212, 214, 216, 218, 252, 260) of a computing device (e.g., a first computing device) configured to function as an endpoint computing device (e.g., 152*a*, 158, 162*a*, 168, 174, 172*a*, 176, 182*a*, 184, 188, 320, 702*a*, 702*e*, 704, 706), referred to as a "processor." In various embodiments, the computing device may be configured to determine whether the data packet delay is changing (e.g., increasing). The computing device also may be configured to transmit an indication of the changed (increased) data packet delay to a network element of a communication network. In some embodiments, the computing device may include a processor, memory (e.g., 220, 258, 902, 908, 1016) coupled with the processor, and instructions stored in the memory and executable by the processor to cause the computing device to perform the operations 800*b*-800*d*.

Referring to FIG. 8B, after performing the operations of blocks 802-808 as described with reference to FIG. 8A, the processor may determine whether a difference between the data packet delay ($D_1$) and a previously-determined data packet delay ($D_0$) between the first computing device and the second computing device exceeds a delay threshold in determination block 810. In some embodiments, the processor may determine whether the absolute value of the difference between $D_1$ and $D_0$ (i.e., $|D_1-D_0|$) exceeds the delay threshold as illustrated.

In response to determining that the difference between the data packet delay and the previously-determined data packet delay does not exceed the delay threshold (i.e., determination block 810="No"), the processor may perform the operations of blocks 802-808 as described with reference to FIG. 8A.

In response to determining that the difference between the data packet delay and the previously-determined data packet delay does not exceed the delay threshold (i.e., determination block 810="Yes"), the processor may transmit the determined data packet delay to a network element of a communication network in block 812. In some embodiments, the processor may configure a message including the data packet delay ($D_1$) to enable the network element of the communication network to use the determined packet delay to set a quality of service for a communication path between the first computing device and the second computing device. In some embodiments, the processor may transmit to the network element (e.g., a network element of a communication network supporting the communication path between the first computing device and the second computing device) an indication of the determined data packet delay. The indication may be configured (e.g., in terms of information content and format) to enable the network element of the communication network to configure the communication network to provide sufficient QoS to support an end-to-end QoS requirement based on the determined data packet delay.

The processor may perform the operations of blocks 802-822 from time to time.

Referring to FIG. 8C, after performing the operations of blocks 802-808 as described with reference to FIG. 8A, the processor may determine whether the data packet delay ($D_1$) is greater than a previously-determined data packet delay ($D_0$) between the first computing device and the second computing device in determination block 820 (for example, whether $D_1>D_0$).

In response to determining that the data packet delay is not greater than the previously-determined data packet delay (i.e., determination block 810="No"), the processor may perform the operations of blocks 802-808 as described with reference to FIG. 8A.

In response to determining that the data packet delay is greater than the previously-determined data packet delay (i.e., determination block 810="Yes"), the processor may transmit the determined data packet delay to a network element of a communication network in block 822. In some embodiments, the processor may configure a message including the data packet delay ($D_1$) to enable the network element of the communication network to use the determined packet delay to set a quality of service for a communication path between the first computing device and the second computing device. In some embodiments, the processor may transmit, to the network element (e.g., a network element of a communication network supporting the communication path between the first computing device and the second computing device) an indication of the determined data packet delay configured (e.g., in terms of information content and format) to enable the network element of the communication network to configure the communication network to provide sufficient QoS to support an end-to-end QoS requirement based on the determined data packet delay.

The processor may perform the operations of blocks 802-822 from time to time.

Referring to FIG. 8D, in some embodiments the first computing device may transmit to the second computing device, and may receive from the second computing device, configuration information that may enable the first computing device to perform operations to configure the first computing device for performing operations for measuring data packet delays in an end-to-end communication path according to various embodiments (e.g., operations 700*f* and 700*g*).

In block 830, the processor may transmit to the second computing device a configuration offer including first configuration information for the transmitting and receiving delay measurement information.

In block 832, the processor may receive from the second computing device a configuration answer including second configuration information that is a subset of the first configuration information.

In block 834, the processor may use the second configuration to transmit the first delay measurement information and to receive the second delay measurement information.

The processor may transmit to a second computing device a first delay measurement message in a first packet with a header portion configured to indicate that the first packet is a data packet in block 802 as described.

Figure 9:
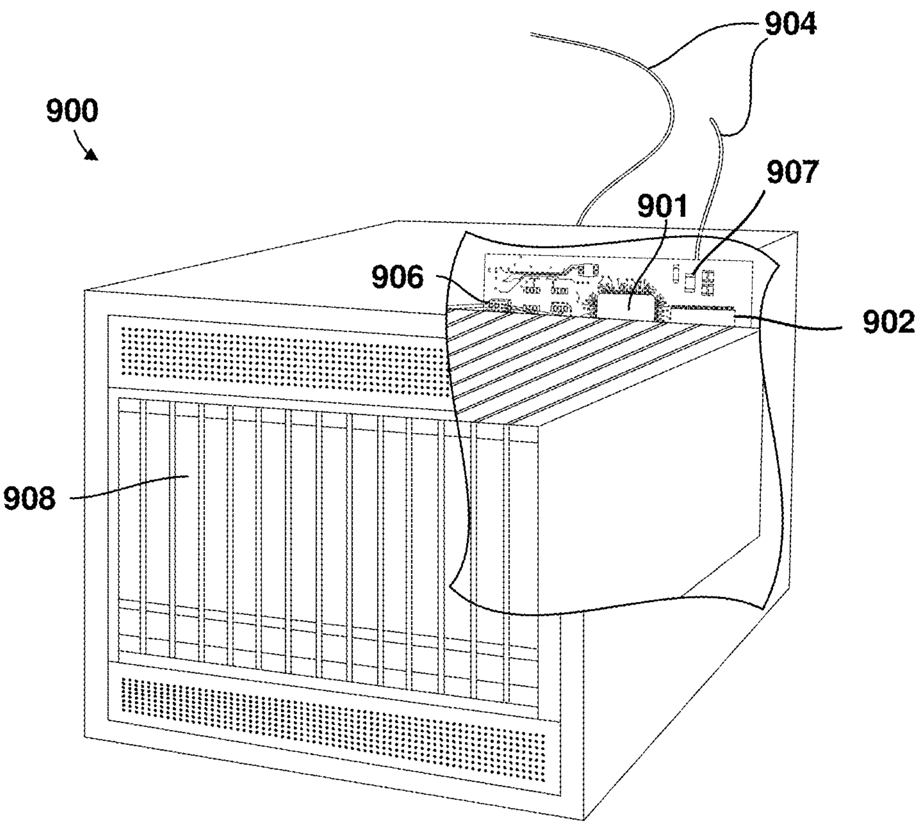
FIG. 9 is a component block diagram of a network element device suitable for use with various embodiments.

FIG. 9 is a component block diagram of a network element device suitable for use with various embodiments. Such network element devices (e.g., a network element (e.g., 402) of the core network 140 or the 5G networks 151*a*, 161*a*, 171*a*, and 181*a*, a base station device (such as the base station 110*a*-110*d*, 200, 350), and/or the like) may include at least the components illustrated in FIG. 9. With reference to FIGS. 1-9, the network element device 900 may typically include a processor 901 coupled to volatile memory 902 and a large capacity nonvolatile memory, such as a disk drive 908. The network element device 900 also may include a peripheral memory access device 906 such as a floppy disc drive, compact disc (CD) or digital video disc (DVD) drive coupled to the processor 901. The network element device 900 also may include network access ports 904 (or interfaces) coupled to the processor 901 for establishing data connections with a network, such as the Internet or a local area network coupled to other system computers and servers. The network element device 900 may include one or more antennas 907 for sending and receiving electromagnetic radiation that may be connected to a wireless communication link. The network element device 900 may include additional access ports, such as USB, Firewire, Thunderbolt, and the like for coupling to peripherals, external memory, or other devices.

Figure 10:
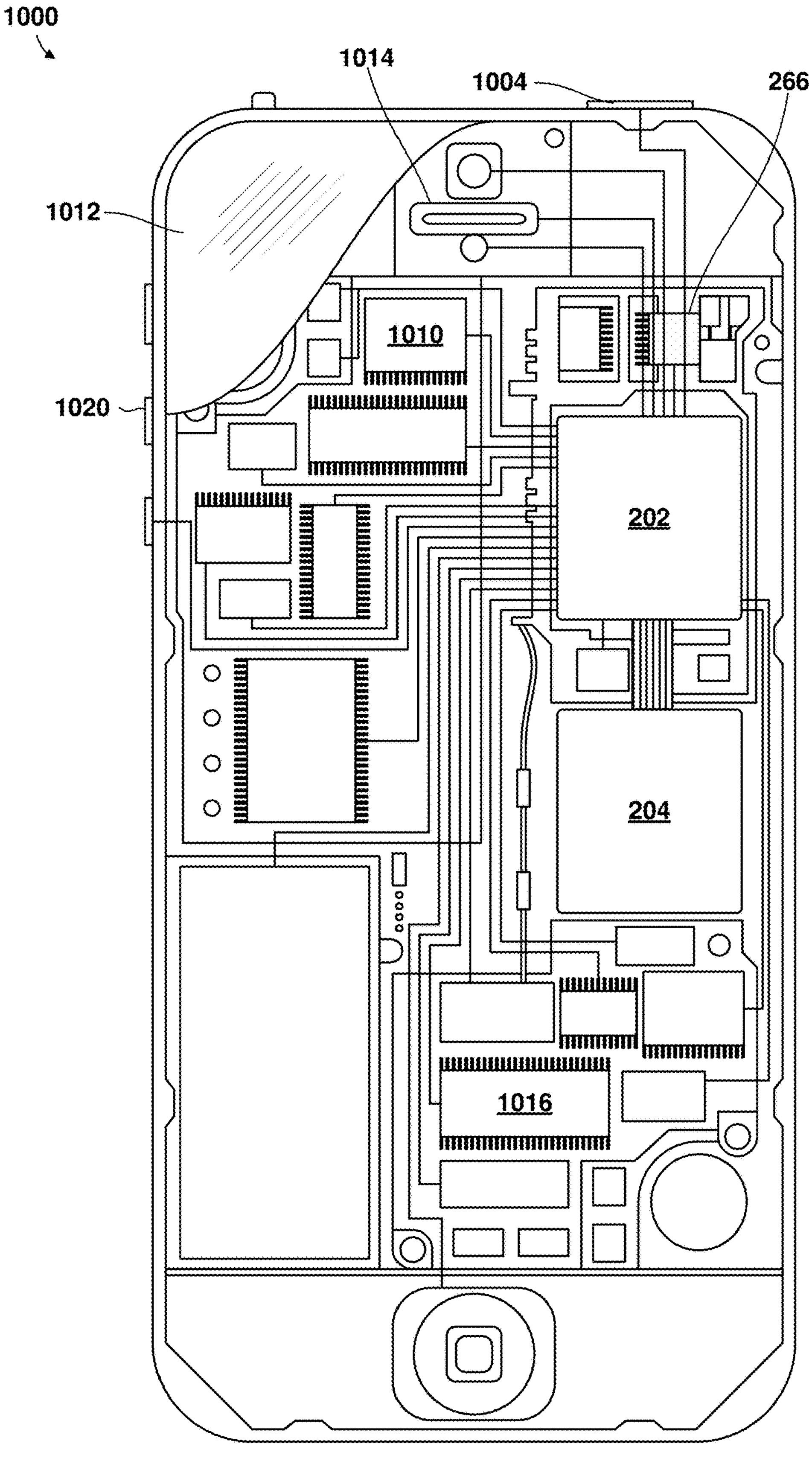
FIG. 10 is a component block diagram of a wireless device suitable for use with various embodiments.

FIG. 10 is a component block diagram of a wireless device 1000 suitable for use with various embodiments. In some embodiments, the wireless device 1000 may operate as a network element. With reference to FIGS. 1-10, various embodiments may be implemented on a variety of wireless devices 1000 (for example, the wireless device 120*a*-120*e*, 200, 320, 404), an example of which is illustrated in FIG. 10 in the form of a smartphone. The wireless device 1000 may include a first SOC 202 (for example, a SOC-CPU) coupled to a second SOC 204 (for example, a 5G capable SOC). The first and second SOCs 202, 204 may be coupled to internal memory 1016, a display 1012, and to a speaker 1014. Additionally, the wireless device 1000 may include an antenna 1004 for sending and receiving electromagnetic radiation that may be connected to a transceiver 427 coupled to one or more processors in the first and/or second SOCs 202, 204. Wireless device 1000 may include menu selection buttons or rocker switches 1020 for receiving user inputs.

The wireless device 1000 may include a sound encoding/decoding (CODEC) circuit 1010, which digitizes sound received from a microphone into data packets suitable for wireless transmission and decodes received sound data packets to generate analog signals that are provided to the speaker to generate sound. One or more of the processors in the first and second SOCs 202, 204, wireless transceiver 266 and CODEC 1010 may include a digital signal processor (DSP) circuit (not shown separately).

The processors of the network element device 900 and the wireless device 1000 may be any programmable microprocessor, microcomputer or multiple processor chip or chips that can be configured by software instructions (applications) to perform a variety of functions, including the functions of some implementations described below. In some wireless devices, multiple processors may be provided, such as one processor within an SOC 204 dedicated to wireless communication functions and one processor within an SOC 202 dedicated to running other applications. Software applications may be stored in the memory 902, 1016 before they are accessed and loaded into the processor. The processors may include internal memory sufficient to store the application software instructions.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 500, 600*a*-600*i*, 700*b*-700*g*, and 800*a*-800*d* may be substituted for or combined with one or more operations of the methods and operations 500, 600*a*-600*i*, 700*b*-700*g*, and 800*a*-800*d*.

Implementation examples are described in the following paragraphs. While some of the following implementation examples are described in terms of example methods, further example implementations may include: the example methods discussed in the following paragraphs implemented by a base station including a processor configured with processor-executable instructions to perform operations of the methods of the following implementation examples; the example methods discussed in the following paragraphs implemented by a base station including means for performing functions of the methods of the following implementation examples; and the example methods discussed in the following paragraphs may be implemented as a non-transitory processor-readable storage medium having stored thereon processor-executable instructions configured to cause a processor of a base station to perform the operations of the methods of the following implementation examples.

Example 1. A method performed by a processor of a first computing device, including transmitting to a second computing device first delay measurement information in a first packet with a header portion configured to indicate that the packet is a data packet, receiving from the second computing device second delay measurement information in a second packet with a header portion configured to indicate that the second packet is a data packet, determining a data packet delay between the first computing device and the second computing device based on transmit timing information of the first packet and receive timing information of the second packet, and using the determined packet delay to set a quality of service for a communication path between the first computing device and the second computing device.

Example 2. The method of example 1, in which the header portion of the first packet indicates that a payload portion of the first packet includes the first delay measurement information.

Example. 3. The method of example 2, in which a synchronization source (SSRC) field of the header portion of the first packet is configured to indicate that the payload portion of the first packet includes the first delay measurement information.

Example 4. The method of any of examples 1-3, in which the header portion of the second packet indicates that a payload portion of the second packet includes the second delay measurement information.

Example 5. The method of example 4, in which an SSRC field of the header portion of the second packet is configured to indicate that the payload portion of the second packet includes the second delay measurement information.

Example 6. The method of any of examples 1-5, including configuring the first packet such that the first delay measurement information or the second delay measurement information includes one or more of an Echo message, an Echo Reply message, a time stamp message, a timestamp, or a collection of timestamps.

Example 7. The method of any of examples 1-6, in which the first delay measurement information or the second delay measurement information is included in an RTP header extension or in a payload portion of an RTP/SRTP packet.

Example 8. The method of any of examples 1-7, in which the transmit timing information of the first delay measurement message includes a first transmit time, the receive timing information of the second delay measurement message includes the first transmit time, a first receive time by the second computing device, a second transmit time of a second delay measurement by the second computing device, and a second receive time of the second delay measurement by the first computing device, and the method further includes determining the data packet delay based on the first transmit time and the first receive time, the second transmit time and the second receive time, or the first transmit time, the first receive time, the second transmit time, and the second receive time.

Example 9. The method of any of examples 1-8, including configuring the first packet such that a payload portion of the first packet includes the first delay measurement information and a data portion.

Example 10. The method of any of examples 1-9, including configuring the first packet with a header extension configured to indicate to the second computing device how to extract the first delay measurement information from the first packet.

Example 11. The method of any of examples 1-10, further including using the determined packet delay as part of setting a quality of service for a communication link between the first computing device and the second computing device, to determine whether a difference between the data packet delay and a previously-determined data packet delay between the first computing device and the second computing device exceeds a delay threshold, and transmit the determined data packet delay to a network element of a communication network in response to determining that the difference between the data packet delay and the previously-determined data packet delay exceeds a delay threshold.

Example 12. The method of any of examples 1-11, in which using the determined packet delay, as part of setting a quality of service for a communication link between the first computing device and the second computing device includes determining whether the data packet delay is greater than a previously-determined data packet delay between the computing device and the second computing device, and transmitting the determined data packet delay to a network element of a communication network in response to determining that the data packet delay is greater than the previously-determined data packet delay.

Example 13. The method of any of examples 1-12, in which transmitting the determined data packet delay includes transmitting an indication of the determined data packet delay configured to enable the network element of the communication network to configure the communication network to provide sufficient Quality of Service (QoS) to support an end-to-end QoS requirement based on the determined data packet delay.

Example 14. The method of any of examples 1-13, in which the communication path between the first computing device and the second computing device spans a first communication network that is a 5G network and a second communication network that is not a 5G network.

Example 15. The method of any of examples 1-14, including transmitting to the second computing device a configuration offer including first configuration information for the transmitting and receiving of delay measurement information, receiving from the second computing device a configuration answer including second configuration information that is a subset of the first configuration information, and using the second configuration to transmit the first delay measurement information and to receive the second delay measurement information.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A first computing device, comprising:

one or more processors;

memory coupled with the one or more processors; and instructions stored in the memory and executable by the one or more processors to cause the first computing device to:

transmit, to a second computing device, first delay measurement information in a first packet with a header portion configured to indicate that the first packet is a data packet, wherein the first packet includes a first header extension that includes an indication of a first transmit time of the first packet, and the first delay measurement information includes the indication of the first transmit time of the first packet;

receive, from the second computing device, second delay measurement information in a second header extension of a second packet with a header portion configured to indicate that the second packet is a data packet, wherein the second delay measurement information includes an indication of a plurality of timestamps, wherein the plurality of timestamps includes the first transmit time of the first packet, a first receive time of the first packet, and a second transmit time of the second packet; and determine one or more data packet delays, in association with a quality of service for a communication path between the first computing device and the second computing device, based at least in part on one or more of the first delay measurement information or the second delay measurement information.

2. The first computing device of claim 1, wherein the instructions are further executable by the one or more processors to cause the first computing device to configure the first packet and the second packet such that the first delay measurement information or the second delay measurement information comprises one or more of an Echo message, an Echo Reply message, a time stamp message, a timestamp, or a collection of timestamps.

3. The first computing device of claim 1, wherein the first header extension includes a real-time transport protocol (RTP) header extension.

4. The first computing device of claim 1, wherein:

the one or more data packet delays comprise a round-trip-time based at least in part on the second delay measurement information including transmit timing information of the first packet and receive timing information of the second packet;

the transmit timing information of the first packet comprises the first transmit time;

the receive timing information of the second packet comprises the first transmit time, the first receive time of the first packet by the second computing device, the second transmit time of the second packet by the second computing device, and a second receive time of the second packet by the first computing device; and the instructions are further executable by the one or more processors to cause the first computing device to determine the one or more data packet delays based on the first transmit time and the first receive time, the second transmit time and the second receive time, or the first transmit time, the first receive time, the second transmit time, and the second receive time.

5. The first computing device of claim 1, wherein the instructions are further executable by the one or more processors to cause the first computing device to use the determined one or more data packet delays, as part of setting the quality of service for the communication path, to:

determine whether a difference between the one or more data packet delays and a previously-determined data packet delay between the first computing device and the second computing device exceeds a delay threshold; and transmit an indication of the determined one or more data packet delays to a network element of a communication network in response to determining that the difference between the one or more data packet delays and the previously-determined data packet delay exceeds a delay threshold.

6. The first computing device of claim 1, wherein the instructions are further executable by the one or more processors to cause the first computing device to use the determined one or more data packet delays, as part of setting the quality of service for the communication path, to:

determine whether at least one of the one or more data packet delays is greater than a previously-determined data packet delay between the first computing device and the second computing device; and transmit an indication of the determined one or more data packet delays to a network element of a communication network in response to determining that the at least one of the one or more data packet delays is greater than the previously-determined data packet delay.

7. The first computing device of claim 1, wherein the instructions are further executable by the one or more processors to cause the first computing device to transmit, to a network element of a communication network, an indication of the determined one or more data packet delays configured to enable the network element of the communication network to configure the communication network to provide the quality of service to support an end-to-end quality of service requirement based on the determined one or more data packet delays.

8. The first computing device of claim 1, wherein the communication path between the first computing device and the second computing device spans a first communication network that is a 5G network and a second communication network that is not a 5G network.

9. The first computing device of claim 1, wherein the instructions are further executable by the one or more processors to cause the first computing device to:

transmit to the second computing device a configuration offer comprising first configuration information for communication of delay measurement information;

receive from the second computing device a configuration answer comprising second configuration information that is a subset of the first configuration information; and use the second configuration information to transmit the first delay measurement information and to receive the second delay measurement information.

10. A method performed by one or more processors of a first computing device, comprising:

transmitting, to a second computing device, first delay measurement information in a first packet with a header portion configured to indicate that the first packet is a data packet, wherein the first packet includes a first header extension that includes an indication of a first transmit time of the first packet, and the first delay measurement information includes the indication of the first transmit time of the first packet;

receiving, from the second computing device, second delay measurement information in a second header extension of a second packet with a header portion configured to indicate that the second packet is a data packet, wherein the second delay measurement information includes an indication of a plurality of timestamps, wherein the plurality of timestamps includes the first transmit time of the first packet, a first receive time of the first packet, and a second transmit time of the second packet; and determining one or more data packet delays, in association with a quality of service for a communication path between the first computing device and the second computing device, based at least in part on one or more of the first delay measurement information or the second delay measurement information.

11. The method of claim 10, comprising configuring the first packet and the second packet such that the first delay measurement information or the second delay measurement information comprises one or more of an Echo message, and Echo Reply message, a time stamp message, a timestamp, or a collection of timestamps.

12. The method of claim 10, wherein the first header extension includes a real-time transport protocol (RTP) header extension.

13. The method of claim 10, wherein:

the one or more data packet delays comprise a round-trip-time based at least in part on the second delay measurement information including transmit timing information of the first packet and receive timing information of the second packet;

the transmit timing information of the first packet comprises the first transmit time;

the receive timing information of the second packet comprises the first transmit time, the first receive time of the first packet by the second computing device, the second transmit time of the second packet by the second computing device, and a second receive time of the second packet by the first computing device; and the method further comprises determining the one or more data packet delays based on the first transmit time and the first receive time, the second transmit time and the second receive time, or the first transmit time, the first receive time, the second transmit time, and the second receive time.

14. The method of claim 10, further comprises:

using the determined one or more data packet delays as part of setting the quality of service for the communication path, wherein using the determined one or more data packet delays comprises:

determining whether a difference between the one or more data packet delays and a previously-determined data packet delay between the first computing device and the second computing device exceeds a delay threshold; and transmitting an indication of the determined one or more data packet delays to a network element of a communication network in response to determining that the difference between the one or more data packet delays and the previously-determined data packet delay exceeds a delay threshold.

15. The method of claim 10, further comprising using the determined one or more data packet delays, as part of setting the quality of service for the communication path, wherein using the determined one or more data packet delays comprises:

determining whether at least one of the one or more data packet delays is greater than a previously-determined data packet delay between the first computing device and the second computing device; and transmitting an indication of the determined one or more data packet delays to a network element of a communication network in response to determining that the at least one of the one or more data packet delays is greater than the previously-determined data packet delay.

16. The method of claim 10, further comprising transmitting, to a network element of a communication network, an indication of the determined one or more data packet delays configured to enable the network element of the communication network to configure the communication network to provide the quality of service to support an end-to-end quality of service requirement based on the determined one or more data packet delays.

17. The method of claim 10, wherein the communication path between the first computing device and the second computing device spans a first communication network that is a 5G network and a second communication network that is not a 5G network.

18. The method of claim 10, further comprising:

transmitting to the second computing device a configuration offer comprising first configuration information for communication of delay measurement information;

receiving from the second computing device a configuration answer comprising second configuration information that is a subset of the first configuration information; and using the second configuration information to transmit the first delay measurement information and to receive the second delay measurement information.

19. A computing device, comprising:

means for transmitting, to another computing device, first delay measurement information in a first packet with a header portion configured to indicate that the first packet is a data packet, wherein the first packet includes a first header extension that includes an indication of a first transmit time of the first packet, and the first delay measurement information includes the indication of the first transmit time of the first packet;

means for receiving, from the other computing device, second delay measurement information in a second header extension of a second packet with a header portion configured to indicate that the second packet is a data packet, wherein the second delay measurement information includes an indication of a plurality of timestamps, wherein the plurality of timestamps includes the first transmit time of the first packet, a first receive time of the first packet, and a second transmit time of the second packet; and means for determining one or more data packet delays, in association with a quality of service for a communication path between the computing device and the other computing device, based at least in part on one or more of the first delay measurement information or the second delay measurement information.

20. A non-transitory processor-readable medium having stored thereon processor-executable instructions configured to cause a processing device in a computing device to perform operations comprising:

transmitting, to another computing device, first delay measurement information in a first packet with a header portion configured to indicate that the first packet is a data packet, wherein the first packet includes a first header extension that includes an indication of a first transmit time of the first packet, and the first delay measurement information includes the indication of the first transmit time of the first packet;

receiving, from the other computing device, second delay measurement information in a second header extension of a second packet with a header portion configured to indicate that the second packet is a data packet, wherein the second delay measurement information includes an indication of a plurality of timestamps, wherein the plurality of timestamps includes the first transmit time of the first packet, a first receive time of the first packet, and a second transmit time of the second packet; and determining one or more data packet delays, in association with a quality of service for a communication path between the computing device and the other computing device, based at least in part on one or more of the first delay measurement information or the second delay measurement information.

21. The first computing device of claim 1, wherein the one or more data packet delays comprise one or more of:

a round-trip-time for the communication path;

a first one-way data delay from the first computing device to the second computing device; or a second one-way data delay from the second computing device to the first computing device.

22. The first computing device of claim 1, wherein the second header extension includes a real-time transport protocol (RTP) header extension.

23. The method of claim 10, wherein the second header extension includes a real-time transport protocol (RTP) header extension.

* * * * *